(12) United States Patent
Ohta et al.

(10) Patent No.: US 8,151,249 B2
(45) Date of Patent: Apr. 3, 2012

(54) OPERATING SYSTEM MONITORING SETTING INFORMATION GENERATOR APPARATUS AND OPERATING SYSTEM MONITORING APPARATUS

(75) Inventors: Ken Ohta, Yokohama (JP); Yu Inamura, Kawasaki (JP); Hisashi Oguma, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 1189 days.

(21) Appl. No.: 11/931,676

(22) Filed: Oct. 31, 2007

(65) Prior Publication Data
US 2008/0155509 A1    Jun. 26, 2008

(30) Foreign Application Priority Data

Oct. 31, 2006  (JP) ............................... P2006-296579
Sep. 25, 2007  (JP) ............................... P2007-248044

(51) Int. Cl.
*G06F 9/44* (2006.01)
*G06F 15/01* (2006.01)

(52) U.S. Cl. ........ 717/127; 717/120; 717/167; 717/170; 709/223; 709/224

(58) Field of Classification Search .......................... None
See application file for complete search history.

(56) References Cited

U.S. PATENT DOCUMENTS

| | | | | |
|---|---|---|---|---|
| 5,623,604 | A  * | 4/1997  | Russell et al. ................ | 717/167 |
| 6,189,051 | B1 * | 2/2001  | Oh et al. ........................ | 717/175 |
| 6,249,817 | B1 * | 6/2001  | Nakabayashi et al. ........ | 709/224 |
| 6,510,521 | B1   | 1/2003  | Albrecht et al. | |
| 6,721,941 | B1 * | 4/2004  | Morshed et al. .............. | 717/127 |
| 6,832,373 | B2   | 12/2004 | O'Neill | |
| 6,901,582 | B1 * | 5/2005  | Harrison ....................... | 717/127 |
| 7,047,528 | B2 * | 5/2006  | Iida ............................... | 717/170 |
| 7,779,295 | B1 * | 8/2010  | Shah et al. .................... | 714/6.32 |
| 7,987,449 | B1 * | 7/2011  | Marolia et al. ................ | 717/120 |
| 2001/0044840 | A1 * | 11/2001 | Carleton ....................... | 709/223 |
| 2003/0158623 | A1 * | 8/2003  | Kumano et al. .............. | 700/213 |
| 2004/0003288 | A1   | 1/2004  | Wiseman et al. | |

(Continued)

FOREIGN PATENT DOCUMENTS

JP           10-111822       4/1998

(Continued)

OTHER PUBLICATIONS

Carl Chang et al, "Computing Curricula 2001" [Online], IEEE, Dec. 15, 2001, pp. 1-240, [Retrived from Internet], [Retrieved on Dec. 7, 2011], <http://delivery.acm.org/10.1145/390000/384275/cc2001.pdf>.*

(Continued)

*Primary Examiner* — Thuy Dao
*Assistant Examiner* — Ziaul A Chowdhury
(74) *Attorney, Agent, or Firm* — Oblon, Spivak, McClelland, Maier & Neustadt, L.L.P.

(57) ABSTRACT

Disclosed is an operating system monitoring setting information generator apparatus including: a monitoring setting information management unit configured to store monitoring setting information used for monitoring of an operating system monitoring apparatus; a monitoring setting information output unit configured to generate a monitoring setting information file including the monitoring setting information stored by the monitoring setting information management unit, version information and binding information indicating a correspondence with a monitoring target software program, and to output the generated monitoring setting information file; and a digital signature unit configured to generate a digital signature of the monitoring setting information file, and to add the generated digital signature to the monitoring setting information file.

14 Claims, 25 Drawing Sheets

U.S. PATENT DOCUMENTS

| | | | |
|---|---|---|---|
| 2004/0243994 A1* | 12/2004 | Nasu | 717/171 |
| 2004/0243997 A1* | 12/2004 | Mullen et al. | 717/174 |
| 2005/0132122 A1 | 6/2005 | Rozas | |
| 2005/0172000 A1* | 8/2005 | Nakamura et al. | 709/203 |
| 2005/0193376 A1* | 9/2005 | Harrison | 717/127 |
| 2005/0262490 A1* | 11/2005 | Thomborson et al. | 717/145 |
| 2006/0101413 A1* | 5/2006 | Kinno et al. | 717/127 |
| 2006/0288223 A1* | 12/2006 | Kiehtreiber et al. | 713/176 |
| 2007/0169064 A1* | 7/2007 | Hagihara et al. | 717/162 |
| 2008/0027963 A1* | 1/2008 | Hiwatashi et al. | 707/101 |

FOREIGN PATENT DOCUMENTS

| | | |
|---|---|---|
| JP | 10-333902 | 12/1998 |

OTHER PUBLICATIONS

Andreas Haeberlen et al., "Practical Accountability for Distributed Systems", [Online], ACM, Oct. 14-17, 2007, pp. 175-188, [Retrieved from Internet], [Retrieved on Dec. 7, 2011], <http://delivery.acm.org/10.1145/1300000/1294279/p175-haeberlen.pdf>.*

John Reumann et al., "Stateful Distributed Interposition",[Online], ACM, Feb. 2004, pp. 1-48, [Retrieved from Internet], [Retrieved on Dec. 7, 2011], <http://delivery.acm.org/10.1145/970000/966786/p1-reumann.pdf>.*

Denis Trcek, "An integral framework for information systems security management", [Online], Elsevier 2003, pp. 337-360, [Retrieved From Internet], [Retrieved on Dec. 7, 2011], <ftp://163.13.193.155/Literature/Fall2003/anintegratedframeworkforIS-securitymanagement_trcek_cs_2003.pdf>.*

* cited by examiner

FIG. 2

| MONITORING SETTING INFORMATION | EXAMPLE VALUES |
|---|---|
| IDENTIFIER OF MONITORING TARGET SOFTWARE PROGRAM | 3 |
| HASH VALUE | abcde1234567890abcde |
| ADDRESS | 0xa000 |
| SIZE | 4KB |
| MONITORING SCHEDULING INFORMATION | EVENT TYPE = CALLING |

FIG. 3

| MONITORING SETTING INFORMATION | EXAMPLE VALUES |
|---|---|
| IDENTIFIER OF MONITORING TARGET MEMORY AREA | 5 |
| ADDRESS | 0xa000 |
| SIZE | 4byte |
| RANGE OF PARAMETER VALUE | 1~100 |
| MONITORING SCHEDULING INFORMATION | 15-minute interval |

| IDENTIFIER OF MONITORING TARGET SOFTWARE PROGRAM | 1 | 2 | 3 |
|---|---|---|---|
| HASH VALUE | abcde1234567 890abcde | 78649a7329a 72b820c22 | cb807367d63c 877b625481 |
| ADDRESS | 0xa000 | 0xc000 | 0x5000 |
| SIZE | 4KB | 2KB | 100KB |
| MONITORING SCHEDULING INFORMATION | 300 SECONDS (5 MINUTES) | 60 SECONDS (1 MINUTE) | 1800 SECONDS (30 MINUTES) |

FIG. 18

| IDENTIFIER OF MONITORING TARGET SOFTWARE PROGRAM | 1 | 2 | 3 |
|---|---|---|---|
| HASH VALUE | abcde1234567890abcde | 78649a7329a72b820c22 | cb807367d63c877b625481 |
| ADDRESS | 0xa000 | 0xc000 | 0x5000 |
| SIZE | 4KB | 2KB | 100KB |
| MONITORING SCHEDULING INFORMATION | PRIORIY2 | PRIORIY1 | PRIORIY3 |

FIG. 21

| IDENTIFIER OF MONITORING TARGET SOFTWARE PROGRAM | 1 | 2 | 3 | 4 | 5 | 6 |
|---|---|---|---|---|---|---|
| HASH VALUE | abcde1234567 890abcde | 78649a7329a 72b820c22 | cb807367d63c 877b625481 | Fbc7389a1482 7bc46282 | Afad274a8d47 2f37f49df | 356a12bd4870 6e2567bb |
| ADDRESS | 0xa000 | 0xc000 | 0x5000 | 0xa200 | 0x3400 | 0x9000 |
| SIZE | 4KB | 2KB | 100KB | 50KB | 10KB | 20KB |
| MONITORING SCHEDULING INFORMATION | CALLING | WRITE DATA TO EXTERNAL STORAGE | EXECUTION OF ELECTRONIC COMMERCE TRANSACTION | OPENING OR CLOSING OF FOLDING TYPE PHONE | PRESSING OF SPECIFIC KEY | SUSPENDING OF OS |

OPERATING SYSTEM MONITORING SETTING INFORMATION GENERATOR APPARATUS AND OPERATING SYSTEM MONITORING APPARATUS

CROSS REFERENCE TO RELATED APPLICATION

This application is based upon and claims the benefit of priority from prior Japanese Patent Applications No. 2006-296579 filed on Oct. 31, 2006, and 2007-248044 filed on Sep. 25, 2007; the entire contents of which are incorporated herein by reference.

BACKGROUND OF THE INVENTION

1. Field of the Invention

The present invention relates to an operating system monitoring apparatus (hereinafter, referred to as an "OS monitor apparatus") arranged in a device such as a mobile phone, personal digital assistance (PDA), personal computer (PC) or information home appliance. The present invention also relates to an operating system monitoring setting information generator apparatus (hereinafter, referred to as an "OS monitoring setting information generator apparatus") configured to generate monitoring setting information for monitoring an operating system (OS).

2. Description of the Related Art

Heretofore, there has been known a technique for monitoring integrity of a memory and files of a monitoring target OS and then for handling a problem, if it occurs, in a device such as a mobile phone or a PC, by use of an OS monitor apparatus arranged in an environment isolated from the OS monitoring target (refer to US Patent Application 20050132122A1).

The OS monitor apparatus stores monitoring setting information (including a hash value, address, size or the like of a binary of software program) for monitoring the memory or files, as a policy.

According to such technique, a monitoring target OS can be protected from a failure or attack by arranging the OS monitor apparatus in an environment isolated from the monitoring target OS.

In the meantime, when a monitoring target software program is updated for applying a patch program to the program or for adding a function thereto, monitoring setting information corresponding to the monitoring target software program needs to be updated as well to be consistent with a change made in the monitoring target software program.

Taking such need into consideration, there is a developed technique to check the compatibility of a software update package with the software configuration of a device based on the signature verification of the software update package or the device identification information (refer to U.S. Pat. No. 6,832,373).

However, in order to securely and efficiently monitor the integrity or soundness of the OS on the device and to maintain a normal operation, the following tasks must be accomplished at the time of both updating and operating the program (a so-called run-time).

(Tasks at Update Time)

One of the tasks at the time of update is prevention of monitoring setting information from being updated by unauthorized monitoring setting information, or by monitoring setting information that is not consistent with the updated software program. The former that is the prevention of monitoring setting information updated by unauthorized one can be checked by use of a digital signature or the like. In order to prevent the latter, however, the following tasks must be accomplished.

A first task is prevention of an inconsistency caused by a failure in updating the monitoring setting information between the updated software program and the monitoring setting information.

Specifically, when the update of monitoring setting information corresponding to the software program fails after the software program is already updated, an inconsistency occurs between the updated software program and the monitoring setting information whose update has failed. In this case, it is difficult to restore the updated software program to the original state due to the limitation of a storage capacity.

In this case, when the device operates in such an inconsistent state, an anomaly state is detected by the OS monitor apparatus, the device is reset and becomes unusable, and a functional restriction is imposed on the device or the like. These are problems reducing user usability.

A second task is prevention of an inconsistency between the software environment in the device and the monitoring setting information.

Specifically, suppose a case when the monitoring setting information is generated under the condition that there is an inconsistency between monitoring setting information and the software update package. In this case, even though the updating of the monitoring setting information succeeds, the inconsistency between the monitoring setting information and the updated software program occurs. Accordingly, there occurs a problem that the monitoring by the OS monitor apparatus fails.

Furthermore, in a case when the monitoring setting information is updated independently of the update of a software program, it is necessary to check whether or not the updated monitoring setting information is consistent with the software environment in the device. If the monitoring setting information is updated while the updated information is not in conformity with the software environment in the device, there is a problem that an inconsistency occurs between the monitoring setting information and the software program.

A third task is prevention of monitoring setting information from being replaced with old monitoring setting information.

Specifically, here, consider an attack to a situation where new monitoring setting information already exists as a result of update. In this situation, the attack is made to replace the new monitoring setting information with the old monitoring setting information. In this case, such an attack cannot be detected by digital signature verification. This results in a problem of generating a threat to cause the monitoring target device to operate in accordance with the old security policy.

(Tasks at the Time of Operation)

There are following tasks at the time of operation, in terms of updating of monitoring setting information and of an increase of efficiency in the updating of monitoring setting information.

A first task is handling of a software program whose arrangement address is determined at the time of operation.

Specifically, as to a device driver or the like dynamically loaded at the time of use, an OS monitor apparatus needs to be notified, by the OS, of the arrangement address of the device driver or the like at the time of operation. There is, however, a problem that a compromised OS is likely to forge information (does not provide truth information).

A second task is a reduction in overhead.

Specifically, when reducing the amount of overhead related to the aforementioned monitoring, it is necessary to consider a trade-off relationship between security maintenance and a measure for preventing the aforementioned monitoring from a response speed or from increasing battery consumption.

BRIEF SUMMARY OF THE INVENTION

In this respect, the present invention is made in view of the aforementioned tasks. Accordingly, a task of the invention is to provide an OS monitoring setting information generator apparatus and an OS monitor apparatus that are capable of securely and efficiently monitoring the integrity or soundness of an OS in a device at the times of both update and operation and of thus maintaining a normal operation of a monitoring target device.

A first aspect of the present invention is summarized as an operating system monitoring setting information generator apparatus comprising: a monitoring setting information management unit configured to store monitoring setting information used for a monitoring performed by an operating system monitoring apparatus; a monitoring setting information output unit configured to generate a monitoring setting information file including the monitoring setting information stored by the monitoring setting information management unit, version information and binding information indicating a correspondence with a monitoring target software program, and to output the generated monitoring setting information file; and a digital signature unit configured to generate a digital signature of the monitoring setting information file, and to add the generated digital signature to the monitoring setting information file. In the first aspect of the present invention, the operating system monitoring setting information generator apparatus may further comprise, the monitoring setting information includes a hash value of the monitoring target software program, an address at which the monitoring target software program is stored and a size of the monitoring target software program.

In the first aspect of the present invention, the operating system monitoring setting information generator apparatus may further comprise, the monitoring setting information includes an address of a monitoring target storage area, a size of the monitoring target storage area and a possible range of a value stored in the monitoring target storage area.

In the first aspect of the present invention, the operating system monitoring setting information generator apparatus may further comprise, the monitoring setting information further includes monitoring scheduling information in which at least one of a timing of the monitoring, a frequency of the monitoring and a cycle of the monitoring are designated.

In the first aspect of the present invention, the operating system monitoring setting information generator apparatus may further comprise, the monitoring scheduling information designates, as the timing of the starting of the monitoring, at least one of the timing of starting the operating system monitoring apparatus, and a type of an event which triggers to perform the monitoring of the monitoring target software program.

In the first aspect of the present invention, the operating system monitoring setting information generator apparatus may further comprise the monitoring scheduling information designates, as the frequency of the monitoring, a priority for the monitoring of the monitoring target software program.

A second aspect of the present invention is summarized as an operating system monitoring apparatus which performs a monitoring of a monitoring target software program on an operating system, comprising; a monitoring unit configured to perform the monitoring by use of monitoring setting information included in a monitoring setting information file generated by an operating system monitoring setting information generator apparatus; an update testing unit configured to determine, before the monitoring target software program is updated, whether or not the monitoring setting information file can be updated; a monitoring setting information update unit configured to update the monitoring setting information file when it is determined that the monitoring setting information file can be updated; and a recovery unit configured to perform a recovery process for the monitoring setting information file when the updating of the monitoring setting information file has failed a predetermined number of times or more.

In the second aspect of the present invention, the operating system monitoring apparatus may further comprise, the update testing unit is configured to check binding information indicating a correspondence between the monitoring setting information file and the monitoring target software program.

In the second aspect of the present invention, the operating system monitoring apparatus may further comprise, an integrity monitoring unit configured to calculate a hash value of the monitoring target software program based on the monitoring setting information, to compare the calculated hash value of the monitoring target software with a original hash value of the monitoring target software program, the hash value of the monitoring target software program included in the monitoring setting information, and to determine that anomaly has occurred in the monitoring target software program when the two hash values do not match with each other.

In the second aspect of the present invention, the operating system monitoring apparatus may further comprise a monitoring controller unit configured to control the monitoring in accordance with monitoring scheduling information included in the monitoring setting information.

In the second aspect of the present invention, the operating system monitoring apparatus may further comprise, an event-based monitoring controller unit configured to control the monitoring to perform when inputted event information has matched with a type of an event designated as a timing of the monitoring in the monitoring scheduling information.

In the second aspect of the present invention, the operating system monitoring apparatus may further comprise a priority-based monitoring controller unit configured to adjust a sequence of the monitoring or a cycle of the monitoring in accordance with a priority which is designated in the monitoring scheduling information.

In the second aspect of the present invention, the operating system monitoring apparatus may further comprise, the monitoring unit is configured to determine whether or not to perform the monitoring in accordance with a monitoring flag indicating whether or not the monitoring is necessary.

In the second aspect of the present invention, the operating system monitoring apparatus may further comprise a self-monitoring unit configured to detect a falsification in a program of the operating system monitoring apparatus itself or a parameter of the operating system monitoring apparatus itself.

In the second aspect of the present invention, the operating system monitoring apparatus may further comprise, a parameter monitoring unit configured to determine that normality of a parameter in a monitoring target storage area based on the monitoring setting information, wherein the monitoring setting information includes an address of the monitoring target storage area, a size of the monitoring target storage area, and a possible range of a value which is stored in the monitoring target storage area.

BRIEF DESCRIPTION OF THE SEVERAL VIEWS OF THE DRAWINGS

FIG. 2 is a diagram showing a specific example of monitoring setting information for monitoring integrity of a monitoring target software program used in the first embodiment of the present invention.

FIG. 3 is a diagram showing a specific example of monitoring setting information for monitoring normality of monitoring target parameters used in the first embodiment of the present invention.

FIG. 18 is a diagram showing a specific example of a priority designation in monitoring scheduling information used in the first embodiment of the present invention.

FIG. 21 is a diagram showing a specific example of event information designation that becomes a trigger in the monitoring scheduling information used in the first embodiment of the present invention.

DETAILED DESCRIPTION OF THE INVENTION

Configurations of OS Monitoring Setting Information Generator Apparatus and OS Monitor Apparatus According to First Embodiment of Present Invention Hereinafter, referring to FIGS. 1 to 6A to 6C, descriptions will be given of configurations of an OS monitoring setting information generator apparatus 10 and an OS monitor apparatus 30 according to a first embodiment of the present invention.

Figure 1:
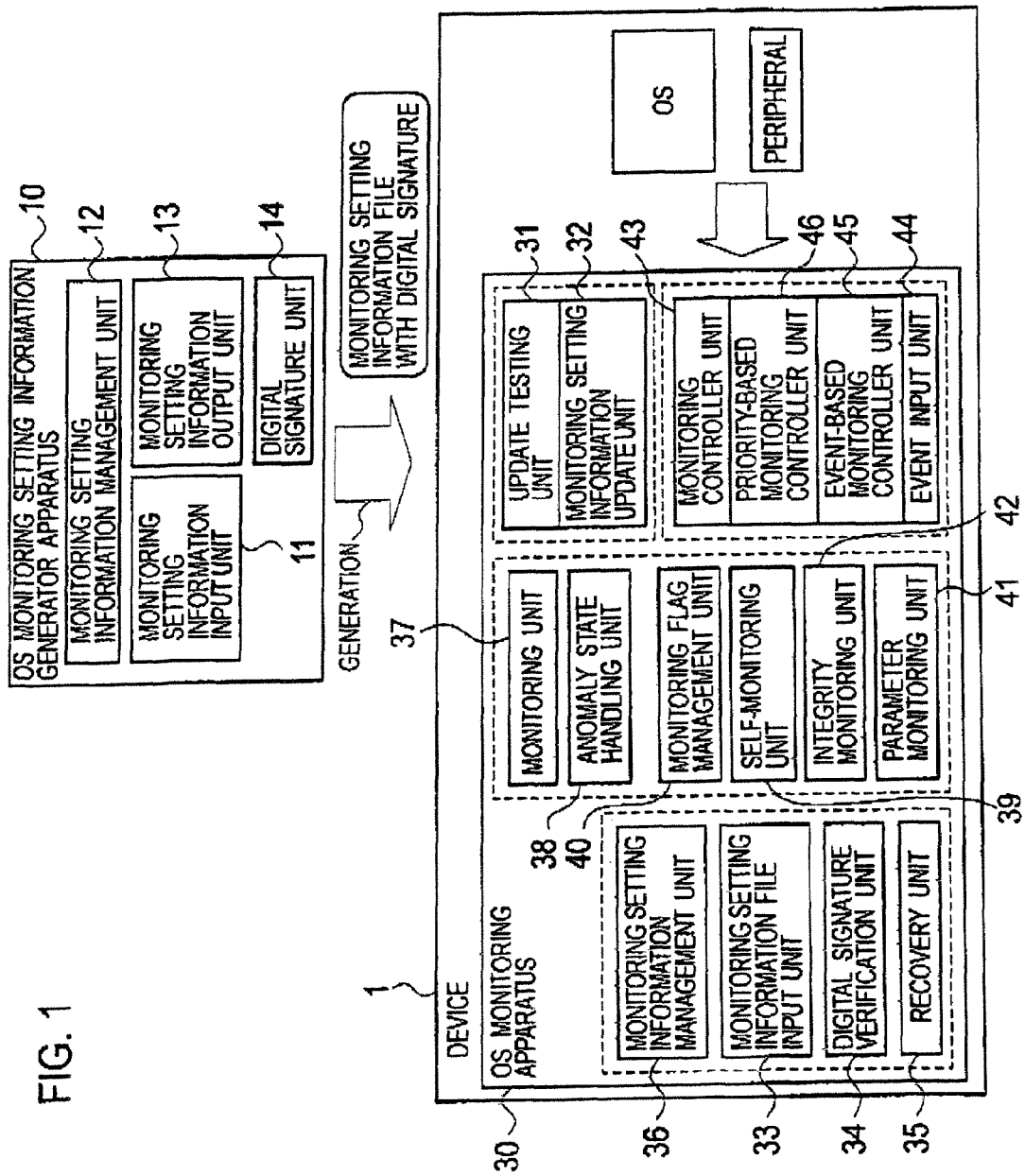
FIG. 1 is a functional block diagram of an OS monitoring setting information generator apparatus and an OS monitor apparatus according to a first embodiment of the present invention.

As shown in FIG. 1, the OS monitoring setting information generator apparatus 10 according to the present embodiment includes a monitoring setting information input unit 11, a monitoring setting information management unit 12, a monitoring setting information output unit 13 and a digital signature unit 14.

Although an assumption is made that the OS monitoring setting information generator apparatus 10 is implemented as a software program in this embodiment, a part of the OS monitoring setting information generator apparatus 10 or the entire OS monitoring setting information generator apparatus 10 may be implemented as a hardware device.

Furthermore, an assumption is made that a tool used along with a tool for generating a software update package of a device is used as the OS monitoring setting information generator apparatus 10. It should be noted that the OS monitoring setting information generator apparatus 10, itself may include a function to generate the software update package.

The monitoring setting information input unit 11 is configured to obtain monitoring setting information corresponding to a monitoring target software program by an input from outside or calculation.

Specific examples of such monitoring information are respectively shown in FIGS. 2 and 3.

FIG. 2 is monitoring setting information for monitoring integrity of a monitoring target software program. Such monitoring setting information includes an identifier of the monitoring target software program, a hash value of the monitoring target software program, an address in which the monitoring target software program is stored, a size of the monitoring target software program and monitoring scheduling information.

Here, the identifier of the monitoring target software program may be the identification number of the monitoring target software program or a character string (for example, a file name) for identifying a file constituting the monitoring target software program.

Moreover, the address in which the monitoring target software program is stored indicates an address of the binary of the monitoring target software program stored in a flash ROM in a case where the monitoring target software program is directly performed in the flash ROM.

Furthermore, since such address is the address used for monitoring the monitoring target software program, the address may be the top address (start address for performing) of or an address in the middle of the monitoring target software program.

In addition, the hash value of the monitoring target software program is one calculated as a value of 160 bits by use of SHA1 algorithm for the monitoring target software program of the range from the address "0xa000" to "4 KB" in the example of FIG. 2.

Moreover, the monitoring scheduling information designates at least one of a timing of the aforementioned monitoring, a frequency of monitoring and a cycle of the monitoring.

For example, the monitoring scheduling information may include a type of an event that triggers to perform the monitoring of the monitoring target software program or the timing of starting the OS monitor apparatus 30, as the designation of the timing of the starting of the monitoring.

Furthermore, the monitoring scheduling information may include the designation of a priority for the monitoring of the monitoring target software program as the designation of the frequency of the monitoring.

It should be noted that as the type of event, "at the time of calling" is designated in the example of FIG. 2.

Furthermore, FIG. 3 shows monitoring setting information for monitoring normality of monitoring target parameters. As shown in FIG. 3, such monitoring target information includes the address of a monitoring target memory area, the size of the monitoring target memory area and the range of a value that can be stored in the monitoring memory area (the range of a normal value).

In this embodiment, as the monitoring target memory area, a RAM, flash ROM or the like is assumed to be used.

In the example of FIG. 3, the normal value of a parameter in a 4-byte memory area with "0xa000" as a start point is a value "from 1 to 100." In a case where a value in a range other than this range is set, it is determined as an anomaly state.

It should be noted that the range of the normal value may be designated by discrete values such as "10, 20, and 30." Moreover, the range of the normal value may be designated by an anomaly value such as "a value not zero" or "a value not within 10 to 15," and thus the range of the normal value is designated in a manner that a value other than the value designated as the anomaly value is the normal value.

The monitoring setting information input unit 11 may be configured to obtain the monitoring setting information from a predetermined setting file, or to obtain the monitoring setting information via an input made by an administrator or operator using a keyboard, mouse or the like.

In addition, the monitoring setting information input unit 11 may be configured to receive a file of a monitoring target software program or a software update package, then to calculate the hash value of or size of the monitoring target software program by itself, and thus to obtain the result of the calculation as the monitoring setting information.

It should be noted that the hash value of a monitoring target software program may be calculated by use of an arbitrary one-way hash function such as SHA-1, SHA-256 or MD5.

The monitoring setting information management unit 12 is configured to store monitoring setting information corresponding to a plurality of monitoring target software programs.

The monitoring setting information management unit 12 is configured to store the monitoring setting information obtained by the monitoring setting input unit 11 in a memory or file system as an arbitrary format such as a table format or list format.

It should be noted that the monitoring setting information management unit 12 is configured to update (overwrite) monitoring setting information to newly obtained monitoring setting information in a case where the monitoring setting information management unit 12 already stores monitoring setting information including the same identifier of the monitoring target software program as the identifier of the monitoring target software program included in the monitoring setting information obtained by the monitoring setting information input unit 11.

Moreover, the monitoring setting information management unit 12 may be configured to receive a delete request for predetermined monitoring setting information via the monitoring setting information input unit 11.

In addition, the monitoring setting information management unit 12 may be configured to manage the monitoring setting information respectively shown in FIGS. 2 and 3 in a mixed manner as different types of monitoring setting information.

The monitoring setting information output unit 13 is configured to generate a monitoring setting information file including at least one piece of monitoring setting information stored by the monitoring setting information management unit 12, version information and binding information showing a correspondence relationship with the monitoring target software program, and to output the generated monitoring setting information file.

Here, the version information indicates the version of the monitoring setting information file. The version information may be determined based on an input by an administrator or operator, or may be determined as a number indicating the next monitoring setting information of the previous monitoring setting information file by the monitoring setting information output unit 13.

For example, the binding information is the version information of the software program update package, the identifier of the software program update package or the version information of the monitoring target software program.

Moreover, the version information of the monitoring target software program is the version information of the entire monitoring target software program to which a software update package such as a predetermined patch or a software update package for adding a function has already been applied.

Figure 4:
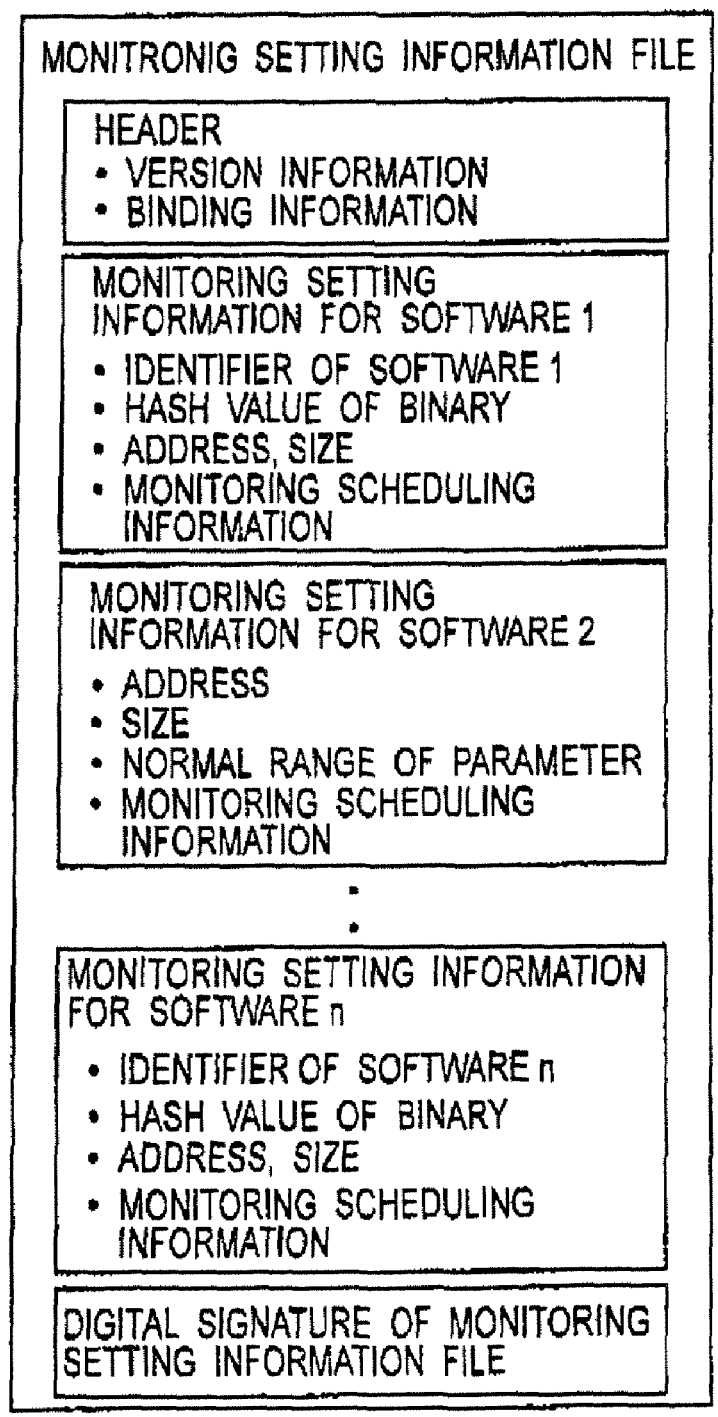
FIG. 4 is a diagram showing a configuration of a monitoring setting information file with a digital signature used in the first embodiment of the present invention.
Figure 5:
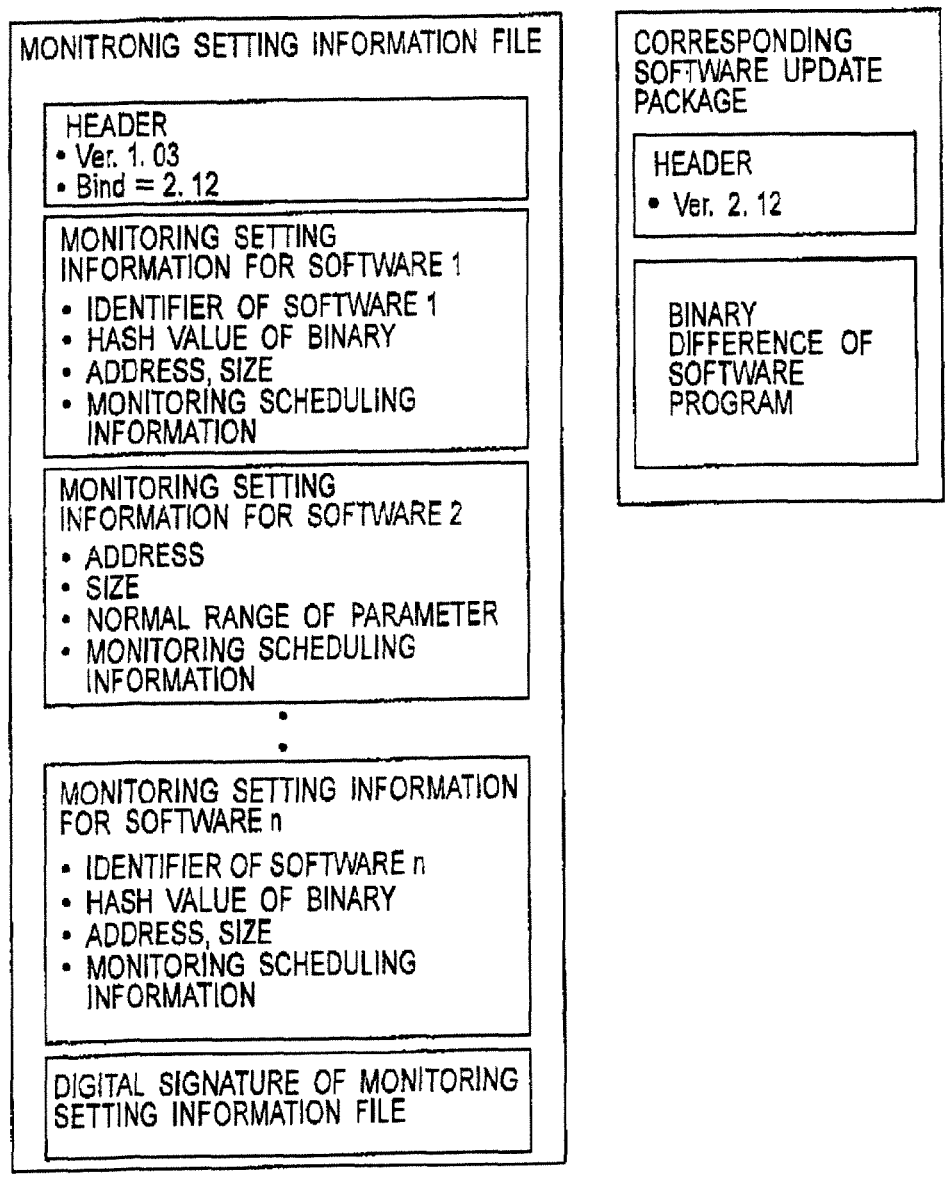
FIG. 5 is a diagram showing a specific example of a monitoring setting information file used in the first embodiment of the present invention.
Figure 6:
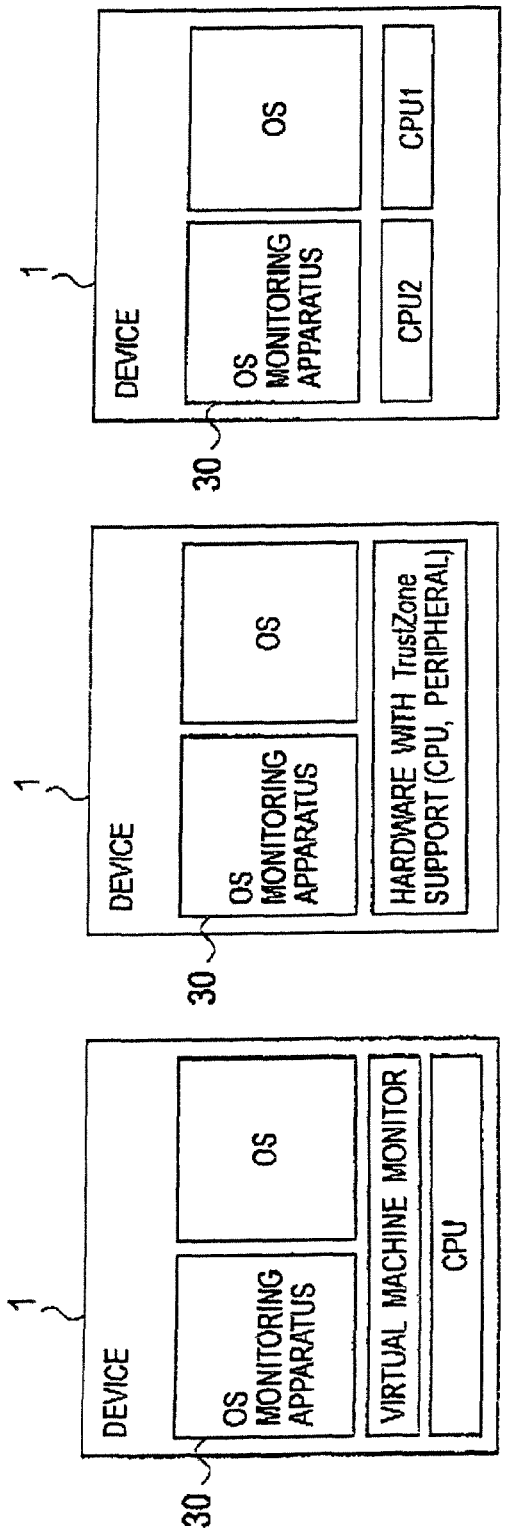
FIGS. 6A to C are configuration diagrams of devices each including the OS monitor apparatus according to the first embodiment of the present invention.

In FIG. 4, a specific example of a configuration of the monitoring setting information file is shown. In FIG. 5, a specific example of such monitoring setting information file is shown.

In the example of FIG. 5, "Version. 1.03" is designated as the version information of the monitoring setting information file. Furthermore, the version information "2.12" of the software update package corresponding to the monitoring setting information file is designated as the binding information.

It should be noted that the monitoring setting information may be in a binary format or an ASCII format. In addition, the monitoring setting information may be compressed for reducing the file size.

The digital signature unit 14 is configured to generate a digital signature of the monitoring setting information file, and to add the generated digital signature to the monitoring setting information file.

Here, the digital signature may be a file separate from the monitoring setting information file, or may be a single file by combining the file with the monitoring setting information file.

In FIG. 4, a configuration of the monitoring setting information file with a digital signature is shown.

The scheme of the digital signature may be in an RSA scheme, or may be an arbitrary scheme such as an ElGamal scheme, USA scheme or Rabin scheme.

In order to store the validity of the digital signature, however, the secrete key used when performing the digital signature needs to be strictly managed by an administrator of the OS monitoring setting information generator apparatus 10 (device maker, for example) and needs to be prevented from being leaked to outside in any event.

As shown in FIG. 1, the OS monitor apparatus 30 according to the present embodiment is configured to monitor a monitoring target software program on the OS.

Specifically, the OS monitor apparatus 30 includes an update testing unit 31, a monitoring setting information update unit 32, a monitoring setting information file input unit 33, a digital signature verification unit 34, a recovery unit 35, a monitoring setting information management unit 36, a monitoring unit 37, an anomaly state handling unit 38, a self-monitoring unit 39, a monitoring flag management unit 40, a parameter monitor 41, an integrity monitor 42, a monitoring controller unit 43, an event input unit 44, an event-based monitoring controller unit 45 and a priority-based monitoring controller unit 46.

In this embodiment, each of the units or controllers of the OS monitor apparatus 30 may be implemented as a hardware component or software program.

In FIGS. 6A to C, configurations of a device including the OS monitor apparatus 30 according to the present embodiment are each shown. In this embodiment, an assumption is made that the OS monitor apparatus 30 is a software program performed in an area (domain) isolated from the monitoring target OS.

Here, as a way of isolating the domain on the same CPU, as shown in FIG. 6A, a domain isolation technique based on a virtual machine monitor described Xen Virtual Machine Monitor in (http://www.cl.cam.ac.uk/Research/SRG/netos/xen/) or the like may be used. Alternatively, a domain isolation technique at a hardware level such as TrustZone from ARM limited, may be used as shown in FIG. 6B.

In addition, as shown in FIG. 6C, the domain may be isolated by performing the OS monitor apparatus 30 on a CPU different from a CPU on which the OS is performed.

The OS monitor apparatus 30 can operate in parallel with the OS and perform the aforementioned monitoring.

The update testing unit 31 is configured to perform, prior to the updating of a monitoring target software program, an update test that determines whether or not the monitoring setting information file corresponding to the monitoring target software program can be updated.

As an example of the update test, there can be cited the verification of a digital signature of a monitoring setting information file, the check of a monitoring setting information file and a software program update package or of a monitoring target software program and the binding information, the check of an available space of a write area, the check on whether or not writing can be performed or the like.

In a case where such an update test fails, the update process of the monitoring target software program is cancelled since the monitoring setting information file cannot be updated in synchronization with the monitoring target software program.

The monitoring setting information update unit 32 is configured to update the monitoring setting information file in a case where it is determined that the monitoring setting information file can be updated.

In this case, the monitoring setting information update unit 32 records the version information of the monitoring setting information file and thereby allows the monitoring setting information file input unit 33 to examine the version information.

Here, the monitoring setting information update unit 32 may utilize a secure storage function in order to securely store the version information.

For example, a large number of hardware base security chips such as Trusted Platform Module (TPM) provide such secure storage function.

In a case where the update of the monitoring setting information file succeeds, the monitoring setting information update unit 32 completes the update process.

On the other hand, in a case where the update of the monitoring setting information file fails, the monitoring setting information update unit 32 retries the updating of the monitoring setting information file. Then, when the retry has failed a predetermined number of times (the upper limit of retry times), the monitoring setting information update unit 32 calls the recovery unit 35.

It should be noted that the timing of aforementioned monitoring setting information file to be downloaded may be the same as the timing of the software update package to be downloaded, or may be different.

Moreover, the primary component downloading the aforementioned monitoring setting information file may be the monitoring setting information update unit 32 or a module such as a software program update module in the device.

After the monitoring setting information update file is downloaded, the monitoring setting information update file is saved in the device by use of an arbitrary storage device such as a flash memory, hard disk drive, or such as an external storage including an SD memory card or the like.

Hereinafter, a specific example of downloading a monitoring setting information file is shown.

According to a first example, a software program update module of the device downloads, via a radio network, from a device management server storing the monitoring setting information file or the software update package, the monitoring setting information file along with the software update package into a device, and then writes the monitoring setting information file into a flash memory.

Thereafter, before updating the software program, the software program update module of the device calls the OS monitor apparatus 30, and causes the update test of the monitoring setting information to be performed by the update testing unit 31, and thereafter, update the software program.

According to a second example, the software program update module of the device downloads from a PC via an USB connection the software program update package to the device. Thereafter, the software program update module of the device downloads the monitoring setting information file into the device.

Thereafter, before updating the software program, the software program update module of the device calls the OS monitor apparatus 30, and causes the update test of the monitoring setting information to be performed by the update testing unit 31, and update the software program thereafter.

According to a third example, the monitoring setting information update unit 32 of the OS monitor apparatus 30 downloads the monitoring setting information file, via a radio network, from a server storing the monitoring setting information file, and then updates only the monitoring setting information file.

It should be noted that the monitoring setting information update unit 32 may periodically make an inquiry to the server whether or not an update of the monitoring setting information file exists, or may be notified of an update of the monitoring setting information file by the sever via push communications.

The monitoring setting information file input unit 33 is configured to check the presence or absence of the monitoring setting information file and also to check the version information at the timing of starting the OS monitor apparatus 30 and to obtain the applicable monitoring setting information file from the aforementioned storage device.

Here, the monitoring setting information file is a file generated by the OS monitoring setting information generator apparatus 10. Furthermore, the monitoring setting information file is downloaded to the device via a network or cable, and then is written into the storage device such as a flash memory by the monitoring setting information update unit 32.

The monitoring setting information file input unit 33 determines that an anomaly exists and calls the recovery unit 35 in a case where it is determined by the aforementioned checking that the applicable monitoring setting information file does not exist or determined that the version information of the applicable monitoring setting information file is different from the expected version (old version information or the like).

At this time, the monitoring setting information file input unit 33 may determine, by examining the aforementioned binding information, whether or not such monitoring setting information is consistent with the current monitoring target software program. Here, the monitoring setting information file input unit 33 calls the recovery unit 35 in a case where the monitoring setting information file is not consistent with the current software program.

The signature verification unit 34 is configured to verify the digital signature added to the monitoring setting information file.

In a case where the verification of the digital signature fails, the signature verification unit 34 determines that the monitoring setting information file is invalid and thus calls the recovery unit 35.

Here, the digital signature needs to be one from a reliable party determined previously in accordance with security policy. Accordingly, the digital signature is supposed to be one authorized by the device maker or a communication carrier, for example.

Furthermore, a public key used when verifying the digital signature is preferably one that is securely saved. For example, the security of the public key can be improved by storing the public key in a non-writable mask ROM or secure storage.

Here, an assumption is made that the signature verification unit 34 is performed mainly at the time of starting the OS monitor apparatus 30. The signature verification unit 34, however, may be performed during the execution of the OS monitor apparatus 30 after the starting of the OS monitor apparatus 30.

The recovery unit 35 is configured to perform a recovery process for the monitoring setting information file when an anomaly related to the monitoring setting information file occurs.

Specifically, the recovery unit 35 performs the recovery process for the monitoring setting information file in a case where the updating of the monitoring setting information file has failed a predetermined number of times or more (the upper limit of the number of retries).

As the recovery process, one possible way is that the device is restarted for causing the software program update module or the monitoring setting information update unit 32 to download the monitoring setting information file again, and then the updating of the monitoring setting information file is attempted again.

Alternatively, as the recovery process, one possible way is to utilize a monitoring setting information file that is saved in an external storage or the like.

The recovery unit 35 turns off a monitoring flag by calling the monitoring flag management unit 40 in a case where it is determined that the recovery of the monitoring setting information file is impossible although these recovery processes are used.

The monitoring setting information management unit 36 is configured to store monitoring setting information included in a monitoring setting information file.

In order for a monitoring process to be easily performed by the monitoring unit 37 at the time of the process of starting the OS monitor apparatus 30, the monitoring setting information management unit 36 extracts the monitoring information in a memory. Moreover, in a case where the file constituting the monitoring information is compressed, the monitoring setting information management unit 36 decompresses the file for the same purpose.

The monitoring unit 37 is configured to monitor a monitoring target software program by use of the aforementioned monitoring setting information and then to call the anomaly state handling unit 38 when it is in an anomaly state.

The monitoring unit 37 reads out monitoring setting information from the monitoring setting information management unit 36 at the timing of starting the OS monitor apparatus 30, and starts the aforementioned monitoring after performing an initialization process when it is necessary.

It should be noted that in accordance with a monitoring flag indicating whether or not the aforementioned monitoring is necessary, the monitoring unit 37 determines whether or not to perform the monitoring. Specifically, the monitoring unit 37 stops the aforementioned monitoring in a case where the monitoring flag managed by the monitoring management unit 40 is off.

The monitoring unit 37 includes an integrity monitoring unit 42 and a parameter monitoring unit 41 as the subsystems.

In the present embodiment, as the monitoring method, an assumption is made that the monitoring of the integrity of the monitoring target software program (or monitoring target data) by the integrity monitoring unit 42 or the monitoring of the normality of the monitoring target parameters by the parameter monitoring unit 41 are performed. A different monitoring method such as the monitoring of an input or output of a peripheral device can be performed, however.

The monitoring unit 37 receives a monitoring request for a predetermined software program from the monitoring controller unit 43 at the time of performing of the OS monitor apparatus 30, then selects a monitoring method for the predetermined software program and performs the monitoring by calling the integrity monitoring unit 42 or the like as appropriate.

The anomaly state handling unit 38 is configured to be called when the monitoring unit 37 detects an anomaly state, and to handle the anomaly.

Specifically, the anomaly state handling unit 38 performs a screen display for notifying a user that the anomaly has occurred, cancels a transaction in performance, performs restarting of the device, performs a recovery process by a software program or data that have been saved, notifies a designated server of the anomaly, restricts a user authority or the like.

Moreover, the anomaly state handling unit 38 may store handling methods respectively corresponding to types of anomaly states (a falsification, deletion or unauthorized access), a monitoring target software program and monitoring target parameters, and then changes a handling method to another in accordance with types of anomaly states or the like.

The self-monitoring unit 39 is configured to detect a falsification in a program of the OS monitor apparatus 30 itself or a parameter of the OS monitor apparatus 30 itself.

In order to protect the self-monitoring unit 39, the self-monitoring unit 39 may be performed in a secure hardware performance environment isolated from the components of the OS monitor apparatus 30.

The self-monitoring unit 39 may periodically monitors the OS monitor apparatus 30, or may monitor the OS monitor apparatus 30 before the performing of the monitoring of the monitoring target software program, or at the time of an occurrence of a predetermined event or state as a trigger. The predetermined event or state includes a case where the device is in an idle state or the like.

The monitoring flag management unit 40 is configured to receive from outside and to store a setting request of a monitoring flag that sets whether or not the monitoring is necessary.

The monitoring flag management unit 40, for example, possibly receives a setting request of a monitoring flag from a remotely located device management server via a radio network, or receives a setting request of a monitoring flag from a device management tool connected by a cable.

The monitoring flag management unit 40 may utilize a secure storage function in order to securely store information related to the monitoring flag.

The parameter monitoring unit 41 is a subsystem of the monitoring unit 37 and examines the normality of monitoring target parameters based on the aforementioned monitoring setting information and then determines the presence or absence of an existence of anomaly.

Specifically, the parameter monitoring unit 41 determine that the normality of the monitoring target parameters in accordance with the address of a monitoring target storage area, the size of the monitoring target storage area and the range (range of a normal value) of the values which is stored in the monitoring target storage area all of which are included in the monitoring setting information. The parameter monitoring unit 41 then determines an existence of anomaly in a case where a monitoring target parameter is not in the range of normal value, and then calls the anomaly state handling unit 38.

It should be noted that the monitoring target parameters may be parameters related to the monitoring target software program or other parameters.

The integrity monitoring unit 42 is a subsystem of the monitoring unit 37 and is configured to calculate a hash value of a monitoring target software program (a memory or file) in accordance with the parameter setting information (the address at which the monitoring target software program is stored, or the size of the monitoring target software program). The integrity monitoring unit 42 is configured to then compare the calculated hash value of the monitoring target software program with a original hash value included in the monitoring setting information, of the monitoring target software program, then to determine that anomaly has occurred in the monitoring target software program when the two hash values do not match with each other, and thus to call the anomaly state handling unit 38.

The integrity monitoring unit 42 is assumed to be called periodically or at the time of an occurrence of a predetermined event. It should be noted that in order to reduce power consumption, the integrity monitoring unit 42 may stop the monitoring operation while the OS is in suspend mode, and then resume the monitoring when the OS resumes and starts the operation.

The monitoring controller unit 43 is configured to control the monitoring of monitoring target software program (or including the monitoring target storage area, monitoring target parameters or the like) in accordance with monitoring scheduling information included in the aforementioned monitoring setting information.

Specifically, the monitoring controller unit 43 is configured to cause the aforementioned monitoring to be performed by calling the monitoring unit 37 in accordance with at least one of the timing of, the frequency of and the cycle of the monitoring, each of which is designated by the monitoring scheduling information included in the monitoring setting information.

The monitoring controller unit 43 may be configured, for example, to cause the monitoring unit 37 (or the integrity monitoring unit 42) by calling in one minute cycle to perform the examination of the integrity of the monitoring target software program or to cause the monitoring unit 37 (or the integrity monitoring unit 42) by calling at a predetermined time to perform the examination of the normality of the monitoring target parameters. Moreover, the monitoring controller unit 43 may be configured, for example, to cause the monitoring unit 37 by calling at the timing of starting the OS monitor apparatus 30 to perform the aforementioned examination.

Moreover, the monitoring controller unit 43 may control the monitoring unit 37 in order that the monitoring unit 37 can stop the monitoring after performing the aforementioned monitoring for a designated period of time or a designated number of times.

The monitoring controller unit 43 includes a priority-based monitoring controller unit 46 and an event-based monitoring controller unit 45 as the subsystems, and calls the priority-based monitoring controller unit 46 and the event-based monitoring controller unit 45 as appropriate based on the monitoring setting information.

The event input unit 44 is configured to receive event information indicating a predetermined event from a monitoring target OS, peripheral device or the like.

As an example of such event, calling, writing of data in an external storage, an execution of a transaction of an electronic commerce, opening or closing of a folding type phone, pressing of a specific key and the like are assumed to be used.

It should be noted that an assumption is made that the OS includes a function to notify the OS monitor apparatus 30 of event information indicating the event, and also the peripheral device includes a function to cause an interruption to the OS monitor apparatus 30 in a case where the aforementioned event occurs.

The event-based monitoring controller unit 45 is a subsystem of the monitoring controller unit 43, and is configured to call and cause the monitoring unit 37 to perform the aforementioned monitoring when the inputted event information has matched with the type of an event designated as the aforementioned timing of monitoring in the aforementioned monitoring scheduling information.

The event-based monitoring controller unit 45, for example, calls the integrity monitoring unit 42 in a case where the event of calling occurs as a predetermined event, and performs the examination of the integrity of the monitoring target software program that designates such event of calling as the timing of the monitoring.

The priority-based monitoring controller unit 46 is a subsystem of the monitoring controller unit 43, and is configured to adjust the sequence the monitoring or cycle of the aforementioned monitoring target software program in accordance with the priority, which is designated in the monitoring scheduling information.

Operations of OS Monitoring Setting Information Generator Apparatus and OS Monitor Apparatus According to First Embodiment of Present Invention A description will be given of an operation of the OS monitoring setting information generator apparatus 10 according to the first embodiment of the present invention with reference to FIG. 7. A description will be given of an operation of the OS monitor apparatus 30 according to the first embodiment of the present invention with reference to FIGS. 8 to 23.

First, referring to FIG. 7, the description will be given of the operation of generating monitoring setting information by the OS monitoring setting information generator apparatus 10 according to the present embodiment.

Figure 7:
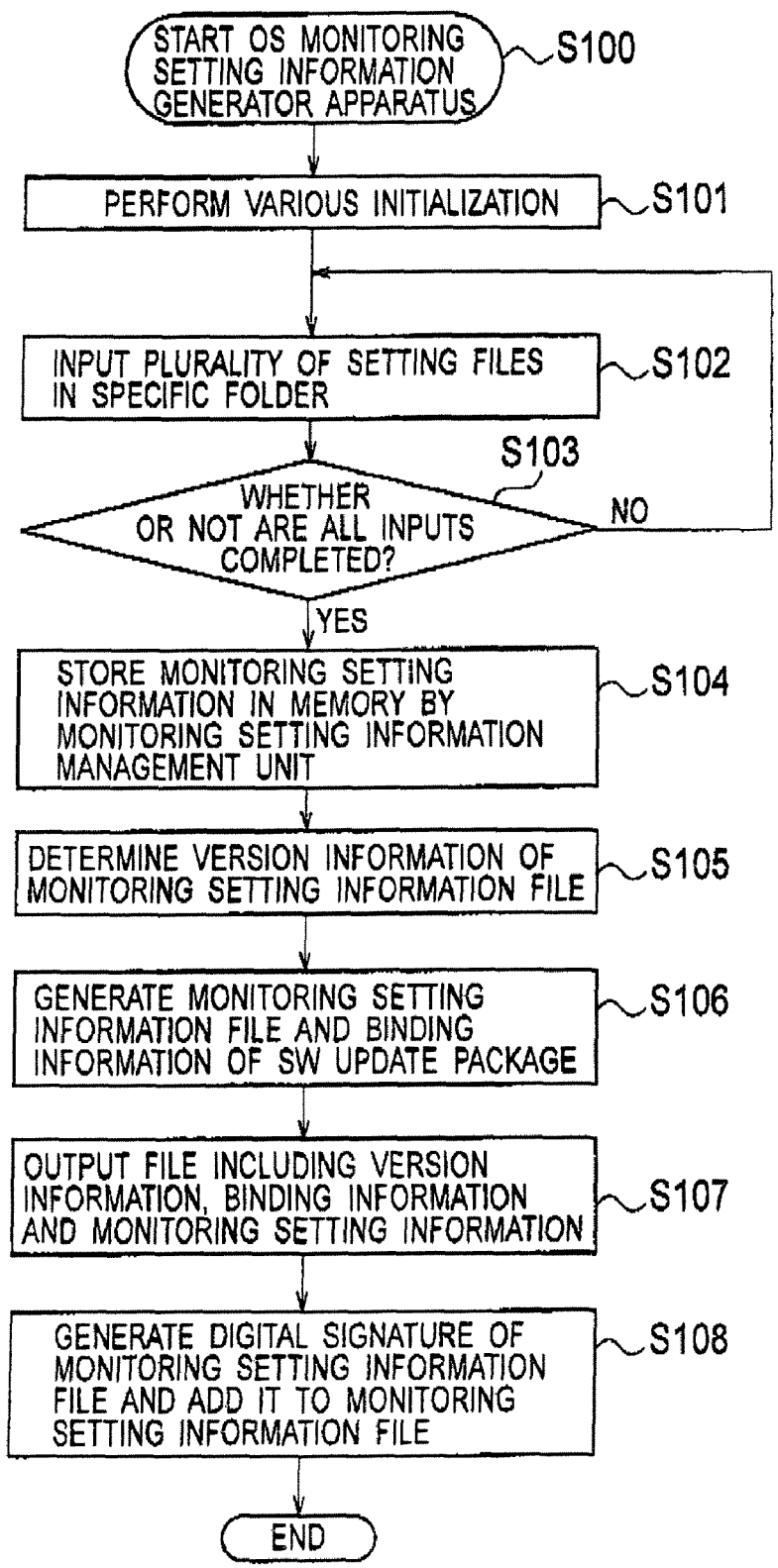
FIG. 7 is a flowchart showing procedures of generating OS monitoring setting information in the OS monitoring setting information generator apparatus according to the first embodiment of the present invention.

As shown in FIG. 7, the OS monitoring setting information generator apparatus 10 is started in step S100, and performs various initialization processes in step S101.

In step S102, the monitoring setting information input unit 11 obtains monitoring setting information from a plurality of setting files in a specific folder.

Here, an assumption is made that monitoring setting information corresponding to one monitoring target software program is saved in one setting file. Moreover, an assumption is made that the monitoring setting information input unit 11 obtains a plurality of setting files and thus obtains a plurality of pieces of monitoring setting information corresponding to a plurality of monitoring target software programs.

It should be noted that although the monitoring setting information input unit 11 obtains monitoring setting information from a setting file in the flowchart of FIG. 7, the monitoring setting information input unit 11 may obtain monitoring setting information input by an operator using a keyboard, mouse or the like, and may also obtain a file constituting the monitoring target software program and then calculate the hash value or size of the monitoring target software program.

In a case where all the necessary monitoring setting information is received by the monitoring setting information input unit 11 in step S103, the monitoring setting information management unit 12 saves the plurality of pieces of monitoring setting information obtained by the monitoring setting information input unit 11 in a memory or file system in step S104

The monitoring setting information output unit 13 determines the version information of the monitoring setting information file in step S105, and generates binding information indicating correspondence information with the monitoring target software program (or software update package) in step S106. The monitoring setting information output unit 13 generates and outputs a monitoring setting information file including at least one or more pieces of the monitoring setting information saved by the monitoring setting information management unit 12, the version information and the binding information in step S107.

In step S108, the digital signature unit 14 generates a digital signature for the aforementioned monitoring setting information file and provided it to the monitoring setting information file. Thereafter, the monitoring setting information file with the digital signature is saved in a device management server or a PC including a software update tool.

Secondly, referring to FIG. 8, a description will be given of an operation in which the OS monitor apparatus 30 updates the monitoring setting information when the monitoring target software program is updated.

Figure 8:
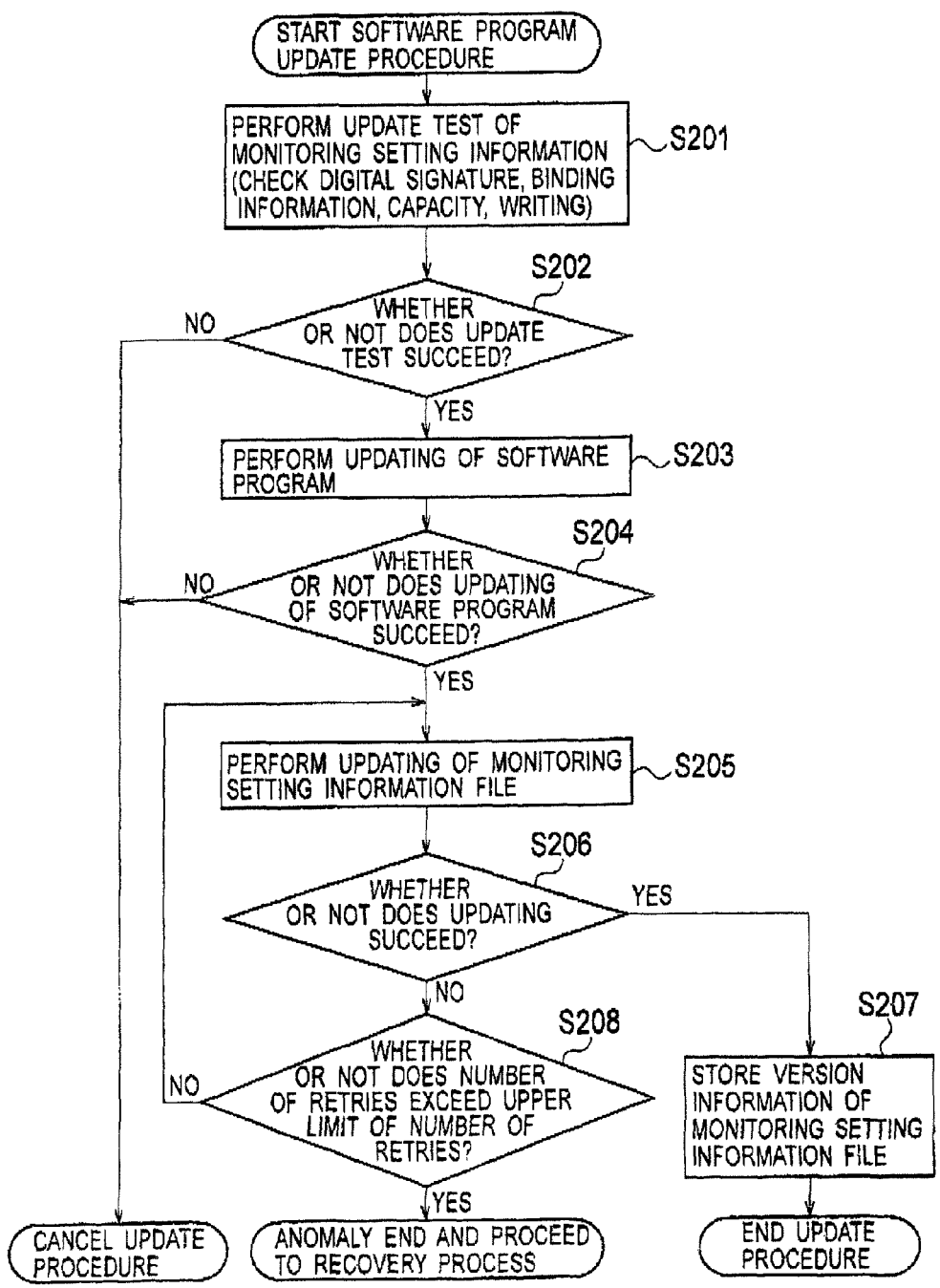
FIG. 8 is a flowchart showing procedures of updating OS monitoring setting information in the OS monitor apparatus according to the first embodiment of the present invention.

As shown in FIG. 8, in step S201, before updating the monitoring target software program, the update testing unit 31 performs an update test to determine whether or not the monitoring setting information can be updated.

This update test includes a verification of the digital signature provided to the monitoring setting information, a check of the binding information, a check of an available space of the write area, a check of whether or not the writing is possible.

In a case where the update test fails in step S202, the monitoring setting information file cannot be updated in synchronization with the updating of the monitoring target software program. Accordingly, the updating of the monitoring target software program is cancelled, and this operation ends.

On the other hand, in a case where the update test succeeds in step S202, a software update function included in the device performs the updating of the software program with the software program update package in step S203. It should be noted that the software program update package and monitoring setting information file may be updated at once in step S203. In this case, the processes in steps S205 and 206 are no longer necessary.

In a case where the updating of the software program fails in step S204, the monitoring setting information file cannot be updated in synchronization with the updating of the monitoring target software program. Accordingly, the updating of the monitoring target software program is cancelled, and this operation ends.

In a case where the updating of the monitoring target software program succeeds in step S204, the monitoring setting information update unit 32 performs the updating of the monitoring setting information file corresponding to the monitoring target software program in step S205.

In a case where the updating of the monitoring setting information file succeeds in step S206, the monitoring setting information update unit 32 records the version information of the monitoring setting information file to allow the monitoring setting information file input unit 33 to check the version information at the timing of starting the OS monitor apparatus 30 in step S207.

On the other hand, in a case where the updating of the monitoring setting information file fails in step S206, the monitoring setting information update unit 32 retries the updating of the monitoring setting information file.

In a case where the updating of the monitoring setting information file fails more than a predetermined number of times (the upper limit of the number of retries) in step S206, the monitoring setting information update unit 32 instructs the monitoring flag management unit 40 to turn off the monitoring flag in order to cancel the monitoring and calls the recovery unit 35.

In accordance with the reason of the failure in updating the monitoring setting information file, the recovery unit 35 retries the updating of the monitoring setting information file after downloading the monitoring setting information again, for example. The recovery unit 35 also retries the updating of the monitoring setting information file after releasing the memory by restarting the OS monitor apparatus 30, or after deleting an unnecessary file.

Thirdly, referring to FIGS. 9 and 10, a description will be given of an operation in which the OS monitor apparatus 30 is started.

Figure 9:
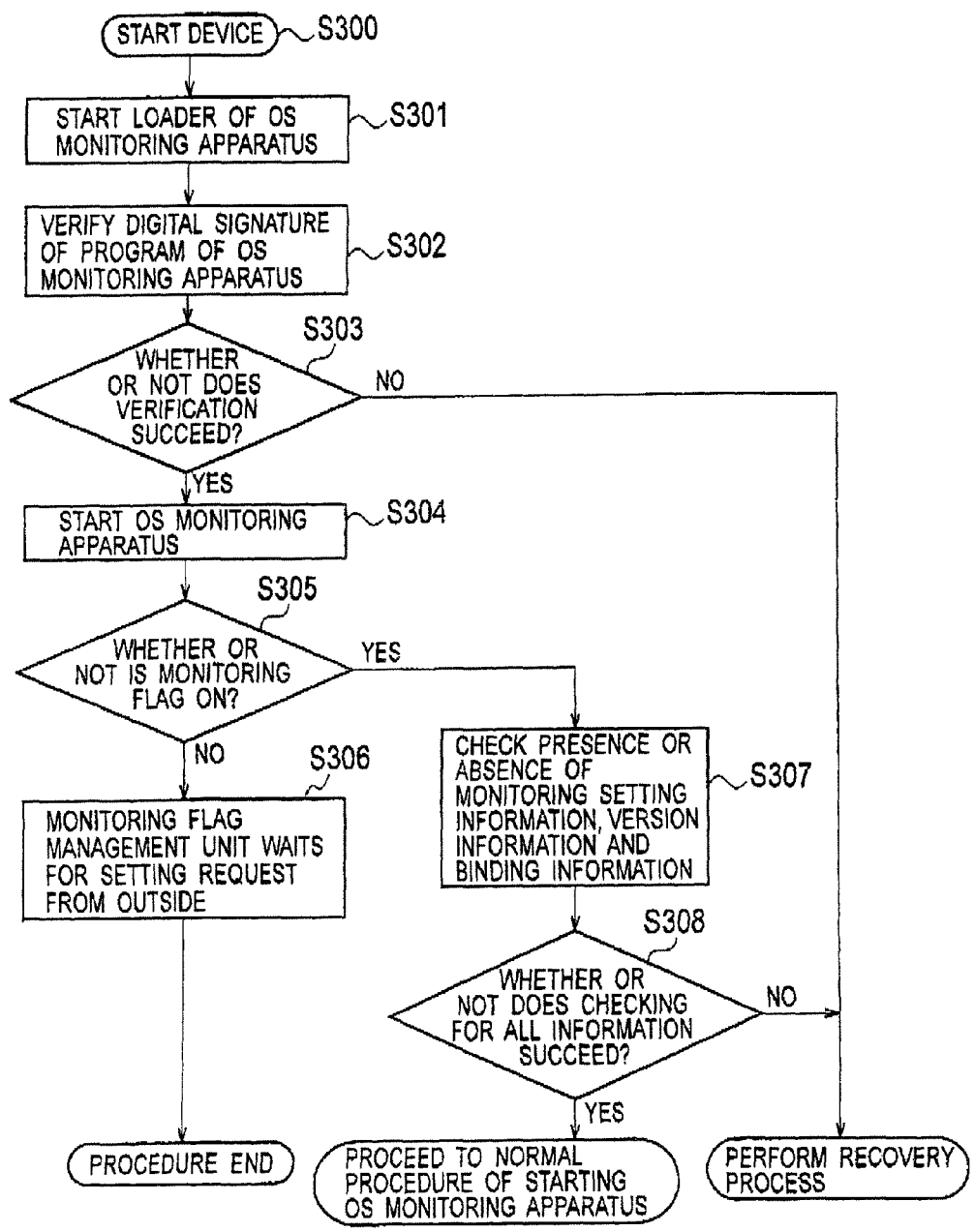
FIG. 9 is a flowchart showing starting procedures in the OS monitor apparatus according to the first embodiment of the present invention.

As shown in FIG. 9, when the device is started in step S300, a loader of the OS monitor apparatus 30 started in step S301 verities, in step S302, the digital signature provided to the program of the OS monitor apparatus before loading the program of the OS monitor apparatus into the flash memory or hard disk drive.

In a case where the verification of the digital signature fails in step S303, since the program of the OS monitor apparatus 30 itself is damaged or modified, a recovery process is performed.

Although an assumption is made in this embodiment that the OS monitor apparatus 30 calls the recovery unit 35 and then the recovery process is performed by the recovery unit 35, another recovery process such as a recovery process of the entire device may be performed.

Moreover, although the verification of the digital signature added to the program of the OS monitor apparatus 30 is performed in this embodiment, the validity of the program of the OS monitor apparatus 30 may be confirmed by calculating a hash value of the program of the OS monitor apparatus 30 and then by determining whether or not the hash value matches with the hash value embedded in the loader of the OS monitor apparatus 30.

In a case where the verification of the digital signature succeeds in step S303, the process of starting the OS monitor apparatus 30 is performed in step S304.

In step S305, the monitoring flag management unit 40 is started and checks the monitoring flag.

In a case where the monitoring flag is determined to be off in step S306, the process shifts to a waiting state for the setting request of the monitoring flag from outside, and then the operation ends.

Specifically, unless a request to turn on the monitoring flag is issued, the monitoring of the monitoring target program is not made effective.

On the other hand, in a case where the monitoring flag is turned on, the self-monitoring unit 39 is started. Then, the monitoring setting information file input unit 33 checks the presence or absence of the monitoring setting information, or the version information or the binding information.

In a case where the monitoring setting information file does not exist in step S308, the monitoring setting information file input unit 33 determines that an anomaly exists and thus calls the recovery unit 35.

Moreover, in a case where the version information included in the monitoring setting information file is different from normal version information in step S308, the monitoring setting information file input unit 33 determines that an anomaly exists and thus calls the recovery unit 35.

Furthermore, in a case where the binding information is not consistent with the current monitoring target software program in step S308, the monitoring setting information file input unit 33 determines that an anomaly exists and thus calls the recovery unit 35.

The recovery unit 35 tries to perform a recovery process by restarting the device, copying the monitoring setting information file that has been saved, or the like, and then, if still the recovery is impossible, calls the monitoring flag management unit 40 and turns off the monitoring flag.

In this embodiment, the verification processes are performed in the order of the checking of the presence or absence of the monitoring setting information file, the checking of the binding information, and the verification of the digital signature. The verifications may be performed in a different order, however.

Figure 10:
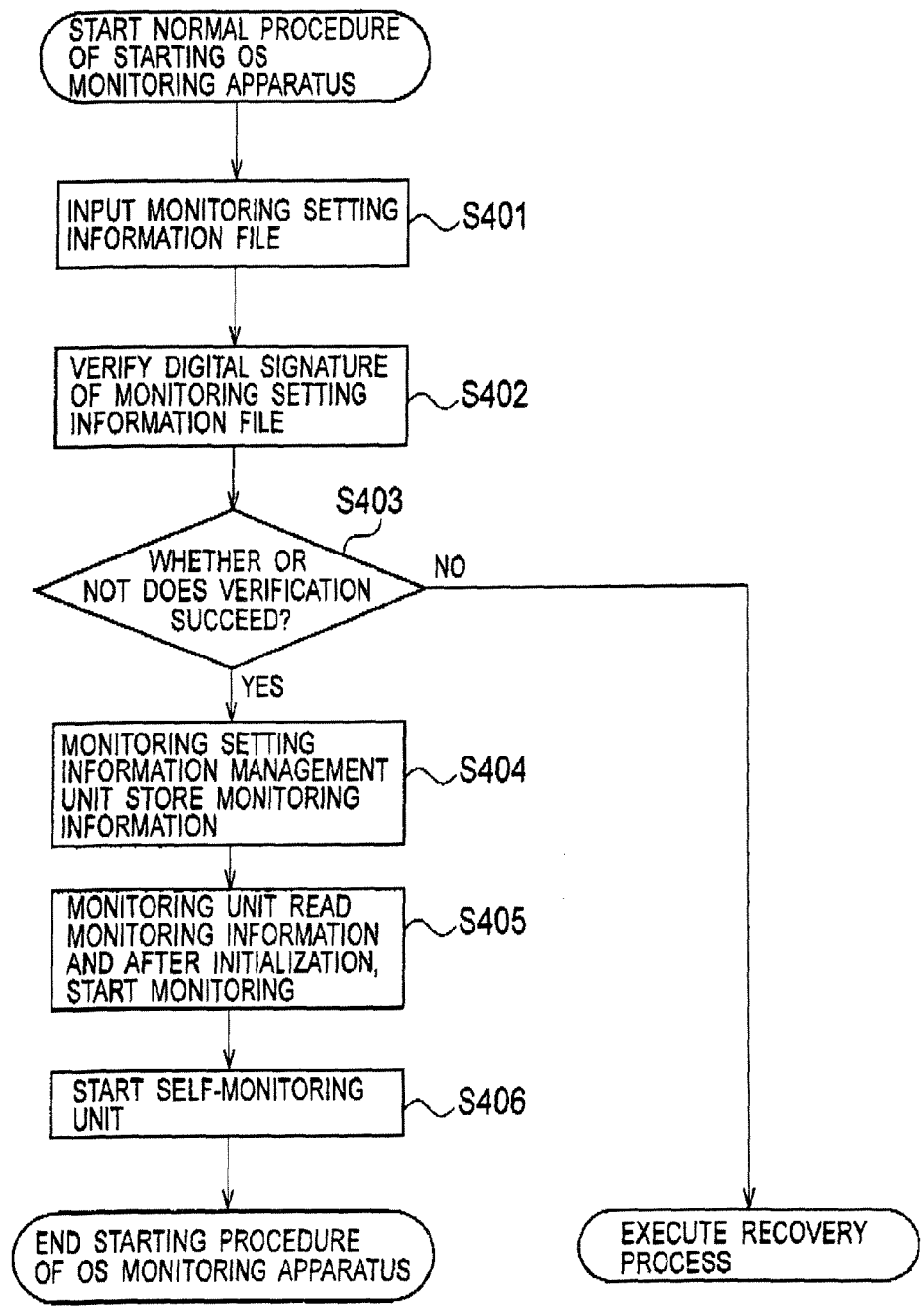
FIG. 10 is a flowchart showing starting procedures in the OS monitor apparatus according to the first embodiment of the present invention.

In a case where the aforementioned examinations succeed in step S308, the monitoring setting information file input unit 33 obtains the monitoring setting information file in step S401 as shown in FIG. 10.

In step S402, the signature verification unit 34 verifies the digital signature provided to the monitoring setting information file.

In a case where the verification of the digital signature fails in step S403, the digital signature verification unit 34 determines that the monitoring setting information is invalid one, and thus calls the recovery unit 35.

In a case where the verification of the digital signature succeeds in step S403, the monitoring setting information management unit 36 stores, in step S404, the monitoring setting information existing in the monitoring setting information file.

In step S405, by use of the monitoring setting information, the monitoring unit 37 initializes the parameter monitoring unit 41 and integrity monitoring unit 42 each of which is a subsystem of the monitoring unit 37, and starts the monitoring of the monitoring target software program or the like.

In this initialization, the monitoring unit 37 calls the monitoring controller unit 43 and performs the schedule management of the monitoring.

In step S406, the self-monitoring unit 39 is started and starts the monitoring of the OS monitor apparatus 30 itself.

Fourthly, referring to FIG. 11, a description will be given of an operation in which the OS monitor apparatus 30 monitors monitoring target parameters.

Figure 11:
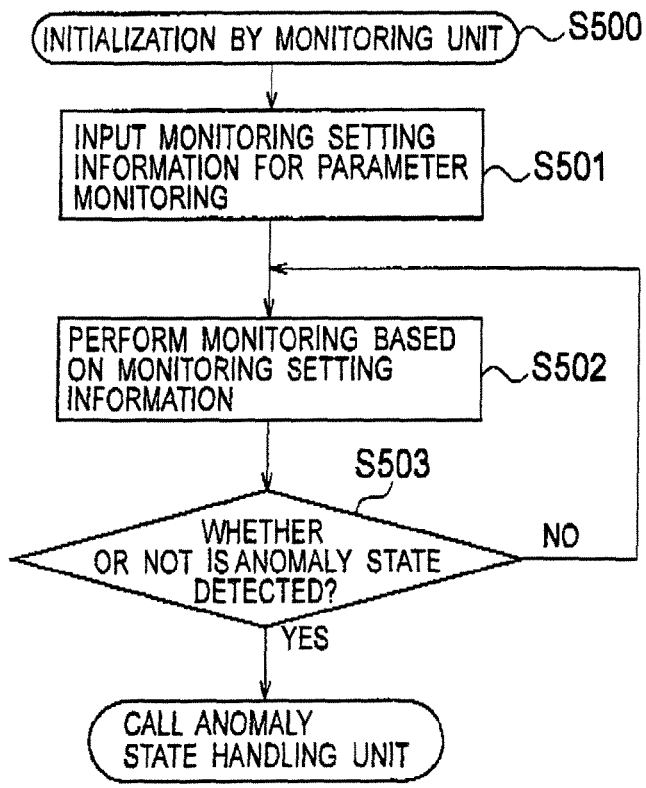
FIG. 11 is a flowchart showing procedures of monitoring parameters in the OS monitor apparatus according to the first embodiment of the present invention.

As shown in FIG. 11, in step S500, as in the case of the operation in FIG. 10, the monitoring unit 37 initializes the parameter monitoring unit 41 by use of the monitoring setting information.

In step S501, as shown in FIG. 3, the parameter monitoring unit 41 obtains, as the monitoring setting information, the address of the monitoring target storage area, the size of the monitoring target storage area and a possible range of the value stored in the monitoring target storage area (range of a normal value).

In step S502, the parameter monitoring unit 41 monitors the monitoring parameters stored in the monitoring target storage area.

In step S503, in a case where a monitoring parameter is outside of the range of the normal value, the parameter monitoring unit 41 determines that an anomaly exists and calls the anomaly state handling unit 38.

The anomaly state handling unit 38 performs the process of handling the anomaly state, the process such as the issuance of notification of an existence of anomaly or restarting of the device by calling a hardware reset.

Fifthly, referring to FIGS. 12 to 13, a description will be given of an operation in which the OS monitor apparatus 30 cyclically monitors the integrity of the monitoring target software program.

Figure 12:
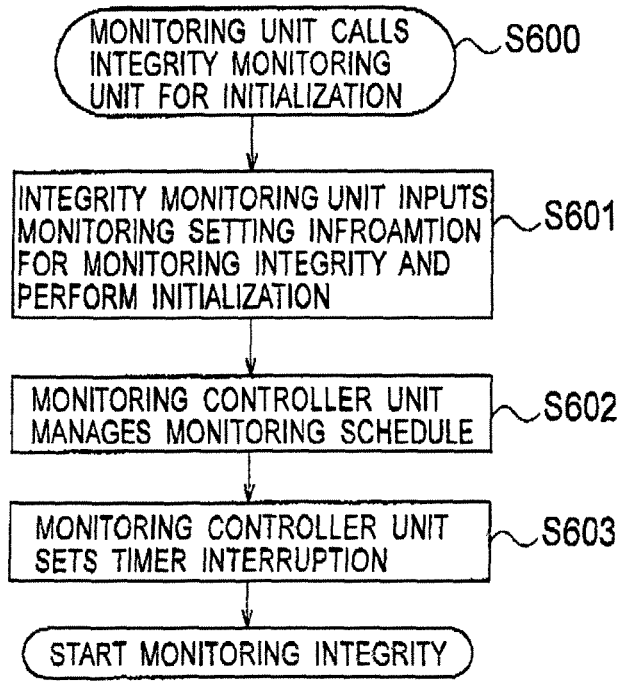
FIG. 12 is a flowchart showing procedures of monitoring integrity in the OS monitor apparatus according to the first embodiment of the present invention.

As shown in FIG. 12, in step S600, as in the case of the operation of FIG. 10, the monitoring unit 37 initializes the integrity monitoring unit 42 by use of the monitoring parameter setting information.

In step 601, the integrity monitoring unit 42 obtains as the monitoring setting information shown in FIG. 2, the identifier of the monitoring target software program, the hash value of the monitoring target software program, the address in which the monitoring target software program is stored, the size of the monitoring target software program and the monitoring scheduling information.

In step S602, the monitoring controller unit 43 performs the schedule management of the aforementioned monitoring by use of the monitoring scheduling information included in the monitoring setting information.

In this embodiment, an assumption is made that the cycle of the aforementioned monitoring is designated as the monitoring scheduling information. Accordingly, as shown in FIG. 13, the cycle of the monitoring of monitoring target software 1 is designated as "5 minutes," the cycle of the monitoring of monitoring target software 2 is designated as "1 minute," and the cycle of the monitoring of monitoring target software 3 is designated as "30 minutes."

The monitoring controller unit 43 may perform the schedule management of the monitoring by use of arbitrary means.

The monitoring controller unit 43, for example, manages the cycles of monitoring target software 1, 2 and 3 by saving values obtained by respectively dividing the values of the monitoring cycles by the value of the start cycle of the monitoring controller unit 43 in an array s having the identifier of the monitoring target software program as an element.

In a case where the start cycle of the monitoring controller unit 43 is "30 seconds," arrays s[1], s[2] and s[31] are respectively set "10," "2" and "60."

The monitoring controller unit 43 increments the value of a counter by "1," each time the monitoring controller unit 43 is called, and then, in a case where the value of the counter can be divided by each of the values respectively stored in the elements of the arrays s without any remainder, the monitoring controller unit 43 monitors the monitoring target software program corresponding to the element.

In step S603, the monitoring controller unit 43 sets a 30-second timer interruption in order to call the monitoring unit 37 at an appropriate timing, for example.

Figures 13, 14:
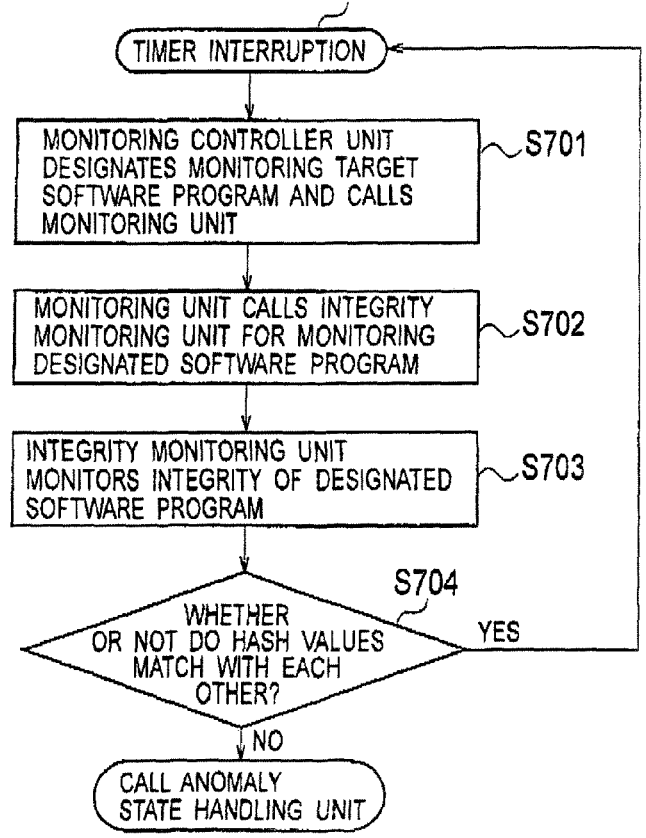
FIG. 13 is a diagram showing a specific example of a monitoring cycle designation in monitoring scheduling information used in the first embodiment of the present invention.
FIG. 14 is a flowchart showing procedures of monitoring integrity in the OS monitor apparatus according to the first embodiment of the present invention.

As shown in FIG. 14, the monitoring controller unit 43 is started when a timer interruption is made as a trigger in step S701. Then, the monitoring controller unit 43 designates the monitoring target software program and calls the monitoring unit 37 in accordance with the determined schedule.

The monitoring controller unit 43, for example, may increment the value of the counter by "1," then scans the arrays a and thereby determine the monitoring target software program.

In step S702, the monitoring unit 37 calls the integrity monitoring unit 42 in order to monitor the designated monitoring target software program.

In step S703, the integrity monitoring unit 42 calculates a hash value of the monitoring target software program in accordance with the address and size (memory or file) in which the designated monitoring target software program is stored, and then compares the calculated hash value with the original hash value of the monitoring target software program, included in the monitoring target setting information.

In step S704, the integrity monitoring unit 42 determines that an anomaly exists in a case where the values do not match with each other, and calls the anomaly state handling unit 38.

In step S704, the integrity monitoring unit 42 waits for the next timer interruption in a case where the both values match with each other.

It should be noted that the integrity monitoring unit 42 may be configured to stop the aforementioned monitoring operation in order to reduce power consumption while the OS is in suspend mode, and then to resume the aforementioned operation when the OS resumes and starts the operation.

Moreover, although the description is given of the operation of the integrity monitoring unit 42 in the example through FIGS. 12 to 14, the parameter monitoring unit 41 can also perform the same scheduling.

Sixthly, referring to FIGS. 15 and 16, a description will be given of an operation in which the OS monitor apparatus 30 monitors the integrity of a software program whose arrangement address is determined at the time of the operation.

Figure 15:
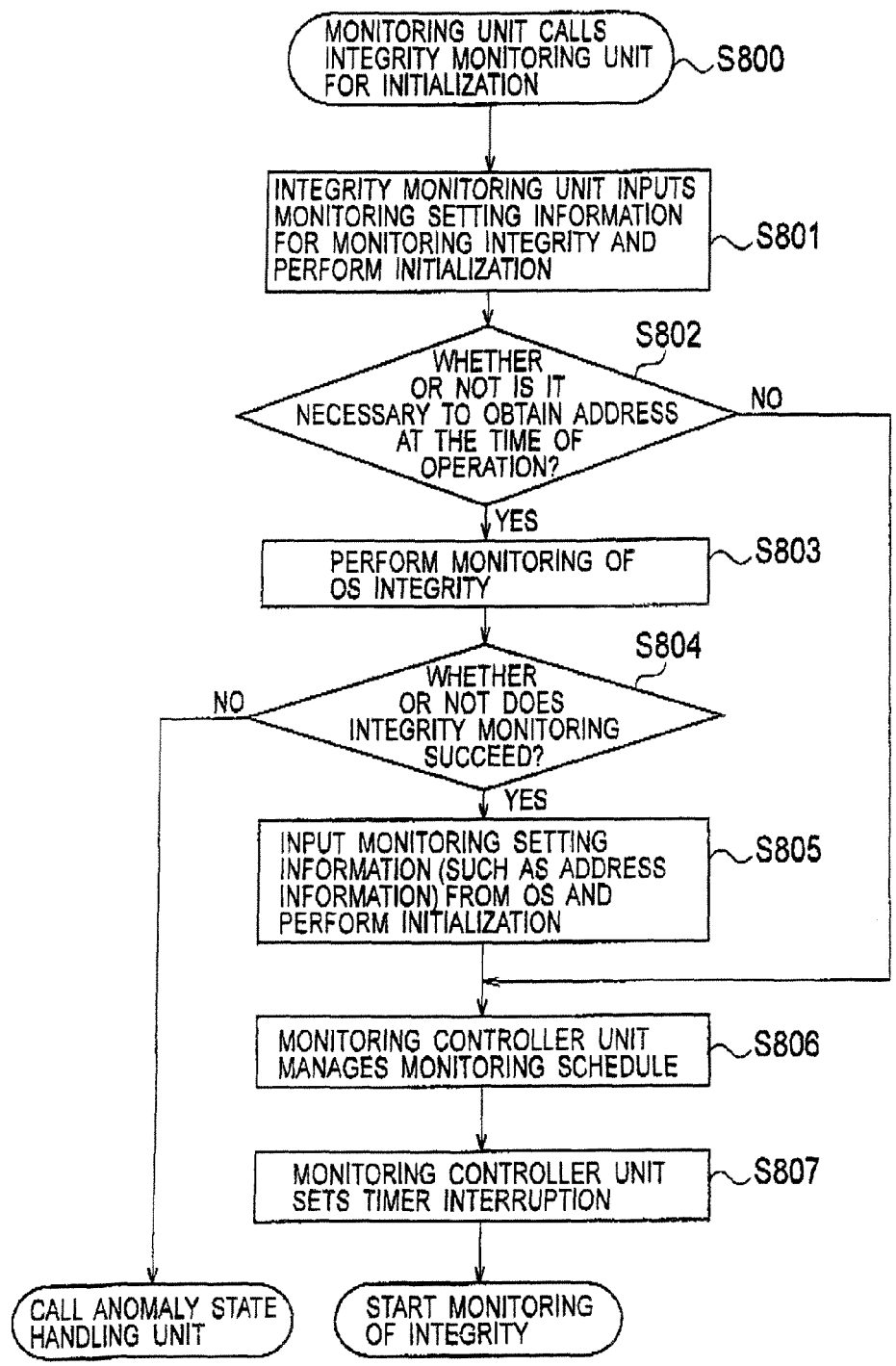
FIG. 15 is a flowchart showing procedures of monitoring integrity of a software program whose arrangement address is determined at the time of operation in the OS monitor apparatus according the to first embodiment of the present invention.
Figure 16:
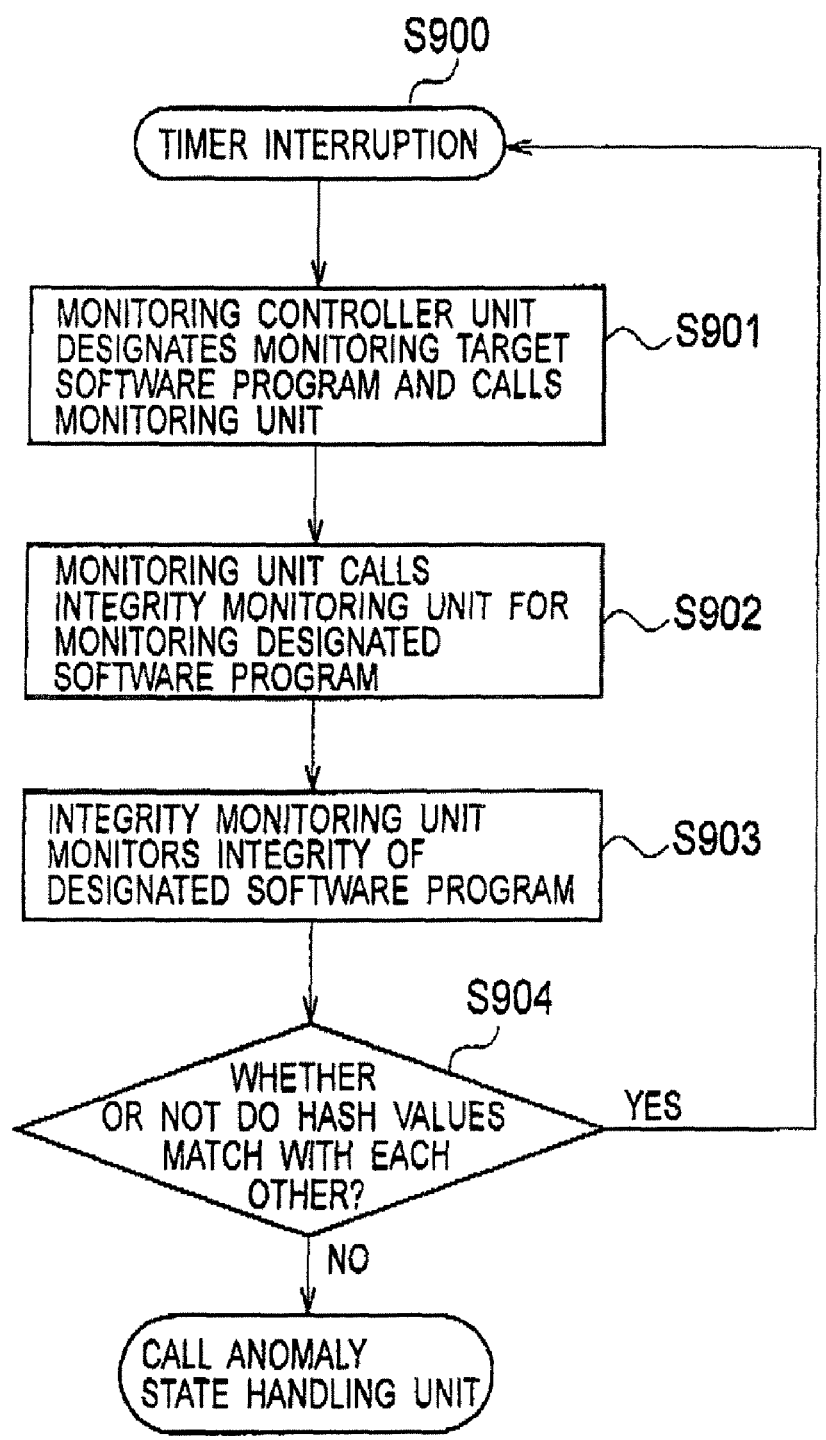
FIG. 16 is a flowchart showing procedures of monitoring integrity of a software program whose arrangement address is determined at the time of operation in the OS monitor apparatus according to the first embodiment of the present invention.

As shown in FIG. 15, the monitoring unit 37 initializes the integrity monitoring unit 42 by use of the monitoring setting information in step S801.

As shown in FIG. 2, in this initialization, the integrity monitoring unit 42 obtains, as the monitoring setting information, the identifier of the monitoring target software program, the hash value of the monitoring target software program, the address in which the monitoring target software program is stored, the size of the monitoring target software program and the monitoring scheduling information.

In step 802, in a case where an address in which a monitoring target software program is stored is not designated or there is an address in which a monitoring target software program is stored is to be determined at the time of operation, the integrity monitoring unit 42 determines that the address in which the monitoring target software program is stored at the time of operation needs to be obtained. Accordingly, the operation proceeds to step S803.

In a case where such address does not exit, the operation proceeds to step S806.

In step S803, the integrity monitoring unit 42 performs the monitoring process of the integrity of the OS and then checks whether or not the OS is compromised.

In step S804, failure of the monitoring of the integrity of the OS means that the OS has already been compromised, so that the integrity monitoring unit 42 calls the anomaly state handling unit 38 and performs a recovery process or the like of the OS.

On the other hand, in a case where the monitoring of the integrity of the OS succeeds, the integrity monitoring unit 42 receives the monitoring setting information including an address in which the monitoring target software program is stored at the time of operation, or the like from the OS, and performs the initialization process in step S805.

It should be noted that the operation through steps S806, S807, and S901 to S904 is the same operation as the operation through steps S602, S603, and S701 to S704 in the aforementioned FIGS. 12 and 14.

seventhly, referring to FIGS. 17 and 18, a description will be given of an operation in which the OS monitor apparatus 30 monitors the integrity of the monitoring target software program based on a priority. In this embodiment, an assumption is made that priorities are designated as monitoring scheduling information as shown in FIG. 18.

Figure 17:
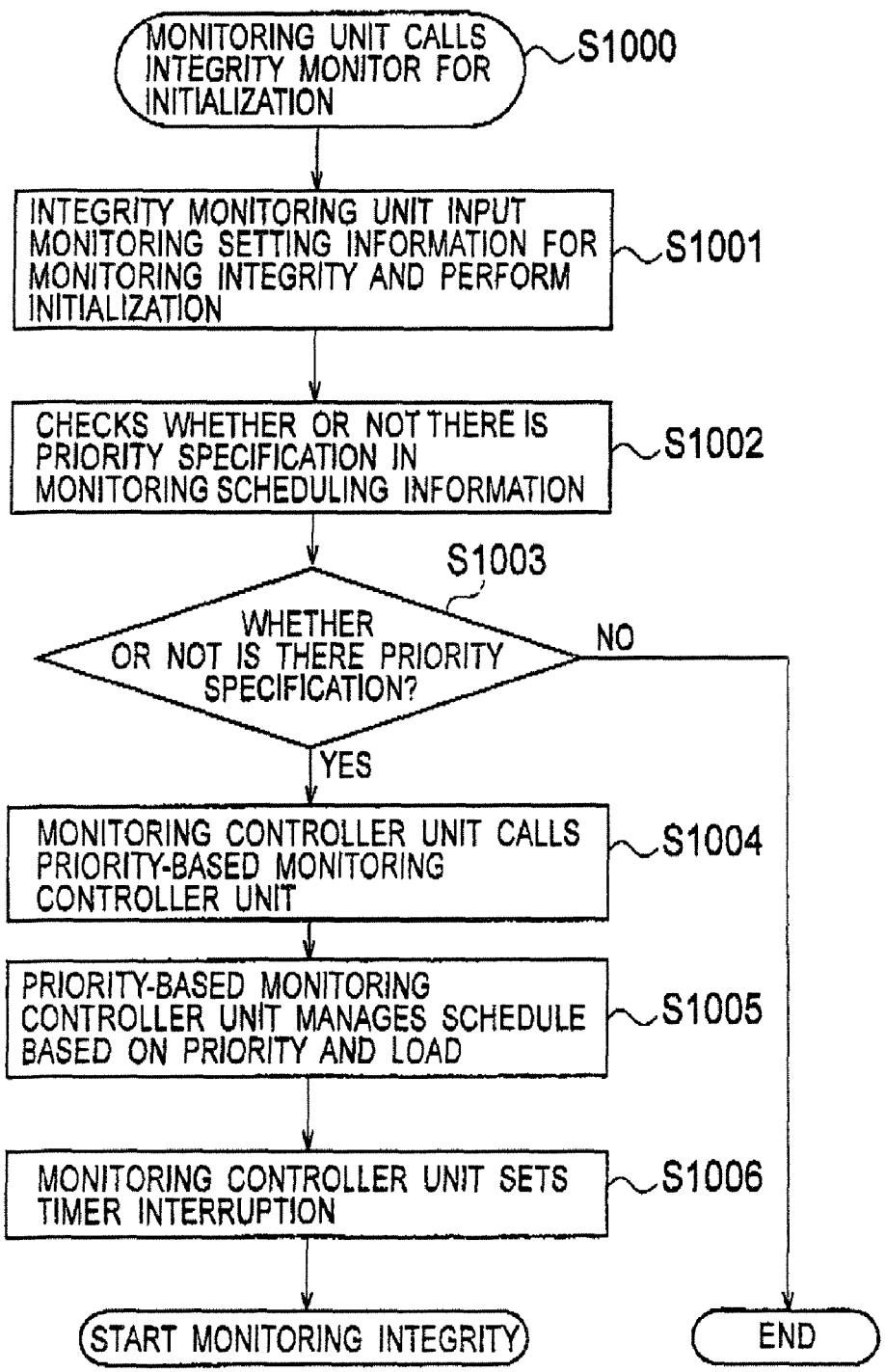
FIG. 17 is a flowchart showing procedures of monitoring integrity based on a priority in the OS monitor apparatus according to the first embodiment of the present invention.

As shown in FIG. 17, the monitoring unit 37 initializes the integrity monitoring unit 42 by use of the monitoring setting information.

Here, in the initialization, as shown in FIG. 18, the integrity monitoring unit 42 obtains, as the monitoring setting information, the identifier of the monitoring target software program, the hash value of the monitoring target software program, the address in which the monitoring target software program is stored, the size of the monitoring target software program and the priorities as the monitoring scheduling information.

In step S1002, the monitoring controller unit 37 checks whether or not the monitoring setting information including the priorities as the monitoring scheduling information is obtained.

In a case where it is determined that the monitoring setting information including the priorities is obtained in step S1003, the monitoring controller unit 37 calls the priority-based monitoring controller unit 46 in step S1004.

In step S1005, the priority-based monitoring controller unit 46 performs schedule management by use of the priority information as the monitoring scheduling information designated in the monitoring setting information.

The schedule management based on the priorities may be performed after the schedule managements described with reference to FIGS. 12 to 14 are performed, or may be performed prior to the schedule managements. Moreover, it is also possible to perform only any one of the schedule managements.

In the example shown in FIG. 18, the priorities of the monitoring of monitoring target software programs 1, 2 and 3 are respectively set "2," "1" and "3" (the priorities are higher in the order of 1, 2 and 3).

The priority-based monitoring controller unit 46 can perform the scheduling in the following manner, for example. The priority-based monitoring controller unit 46 controls the monitoring to be performed on a software program whose priority of the monitoring is equal to or greater than "2" (specifically, a software program whose priority of the monitoring is "3" is not monitored) in a case where the CPU load exceeds "0.3" when the monitoring controller unit 43 is called in a cycle of the timer interruption (30 seconds, for example). Moreover, in a case where the CPU loads exceeds "0.4," the priority-based monitoring controller unit 46 controls the monitoring in order that a software program whose priority of the monitoring is equal to 1 or greater can be monitored (specifically, a software program whose priority of the monitoring is "2," "1" or "3" is not monitored) in this case, for example. Furthermore, in a case where the CPU loads exceeds "0.5," the priority-based monitoring controller unit 46 controls the monitoring in order that any software program cannot be monitored.

In this case, the priority-based monitoring controller unit 46 assigns the identifiers "2," "1" and "3" of the monitoring target software programs to arrays p[1], p[2] and [p]3, respectively.

Then, the priority-based monitoring controller unit 46 extracts a monitoring target software program by use of such array p when the priority-based monitoring controller unit 46 is called by the timer interruption.

In a case where the CPU load is "0.35," for example, with reference to the arrays p[1] and p[2], the priority-based monitoring controller unit 46 can control in order that the software program whose identifier is "2" or "1" can be monitored.

In step S1006, the monitoring controller unit 43 sets a 30-second interruption timer, for example, to call the monitoring unit 37 in an appropriate cycle.

Figure 19:
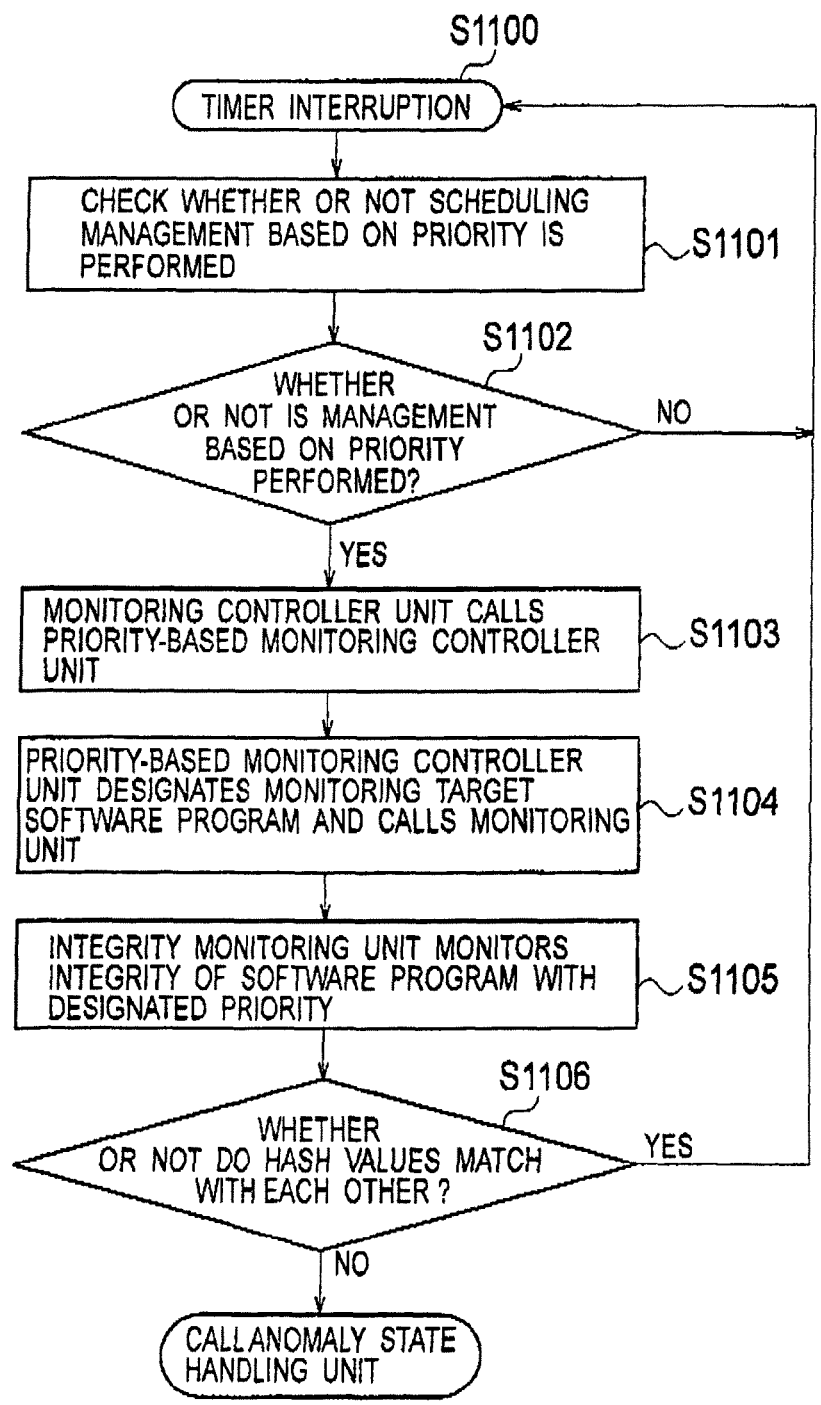
FIG. 19 is a flowchart showing procedures of monitoring integrity based on a priority in the OS monitor apparatus according to the first embodiment of the present invention.

As shown in FIG. 19, in step S1101, the monitoring controller unit 43 is started with the timer interruption as the trigger, and checks whether or not the priority-based schedule management is performed.

In a case where it is determined in step S1102 that the priority-based schedule management is performed, the monitoring controller unit 43 calls the priority-based monitoring controller unit 46 in step S1103.

In step S1104, after determining, based on the current CPU load, the priority for the monitoring to be included in the monitoring target software program, the priority-based monitoring controller unit 46 extracts, by use of the arrays p a monitoring target software program having a higher or the same priority as the priority for the monitoring, and calls the integrity monitoring unit 42.

In step S1105, the integrity monitoring unit 42 calculates a hash value of the monitoring target software program in accordance with the address or size (memory or file) in which the monitoring target software program is stored, and compares the calculated hash value with the original hash value, included in the monitoring setting information, of the monitoring target software program.

In a case where the values do not match with each other, the integrity monitoring unit 42 determines that an anomaly exists and calls the anomaly state handling unit 38 in step S1106.

In a case where the values match with each other, the integrity monitoring unit 42 waits for the next timer interruption in step S1106.

Moreover, although the operation of the integrity monitoring unit 42 is described in the example through FIGS. 17 to 19, the parameter monitoring unit 41 also can perform the same scheduling as that of the integrity monitoring unit 42.

Eighthly, referring to FIGS. 20 and 22, a description will be given of an operation in which the OS monitor apparatus 30 monitors the integrity of a monitoring target software program based on event information. In this embodiment, as shown in FIG. 21, an assumption is made a type of an event (event information) is designated as the monitoring scheduling information.

Figure 20:
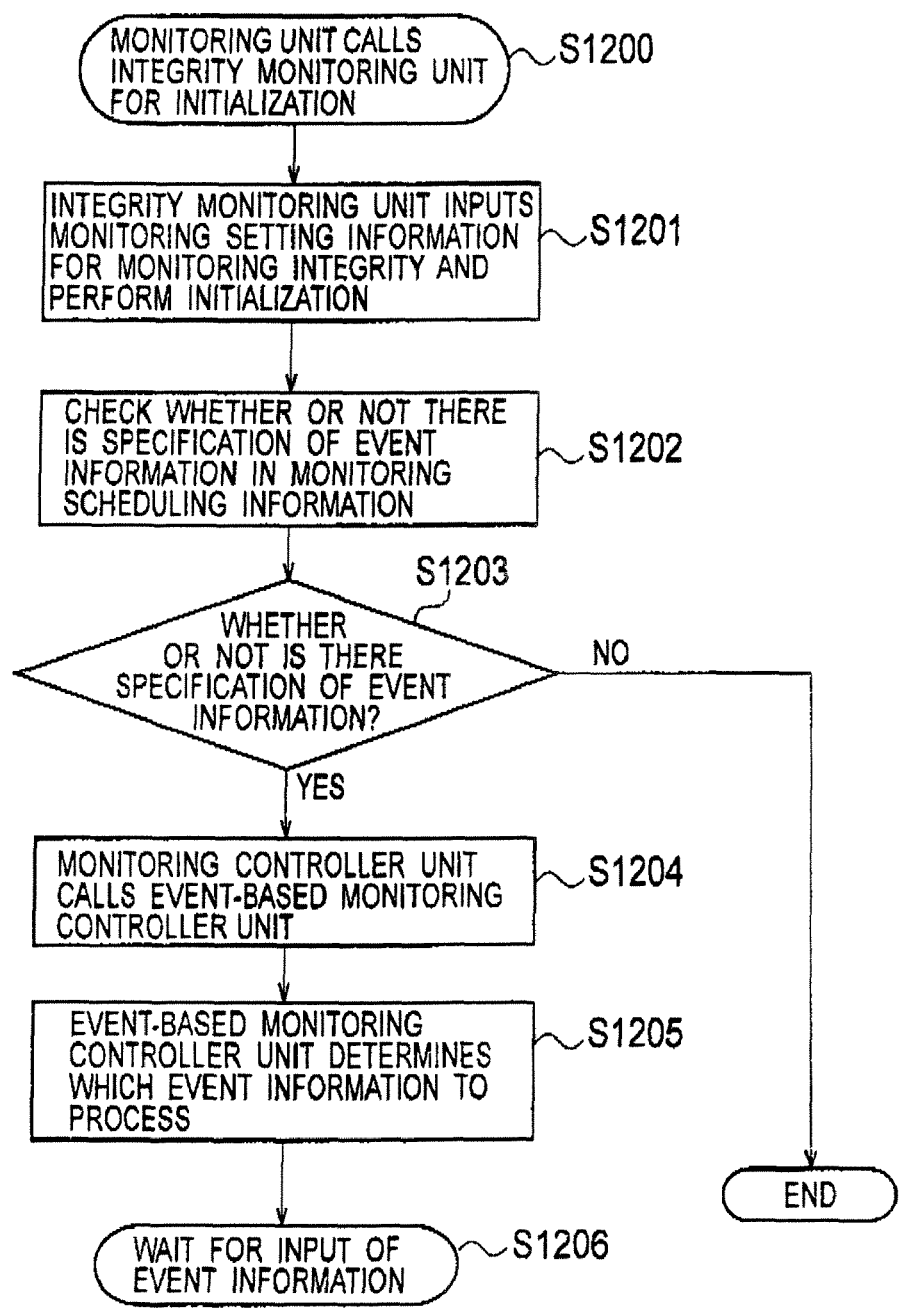
FIG. 20 is a flowchart showing procedures of monitoring integrity based on event information in the OS monitor apparatus according to the first embodiment of the present invention.

As shown in FIG. 20, the monitoring unit 37 initializes the integrity monitoring unit 42 by use of the monitoring setting information in step S1200.

In step S1201, the integrity monitoring unit 42 obtains, in the initialization, as the monitoring setting information shown in FIG. 21, the identifier of the monitoring target software program, the hash value of the monitoring target software program, the address in which the monitoring target software program is stored, the size of the monitoring target software program as the monitoring setting information, and the event information as the monitoring scheduling information.

In step S1202, the monitoring controller unit 43 determines whether or not the monitoring setting information including the event information as the monitoring scheduling information is obtained.

In a case where it is determined in step S1203 that the monitoring setting information including the event information as the monitoring scheduling information is obtained, the monitoring controller unit 43 calls the event-based monitoring controller unit 45 in step S1204.

In step S1205, the event-based monitoring controller unit 45 scans the event information as the monitoring scheduling information and determines the event information to be processed.

As shown in FIG. 21, as the event information for monitoring target software program 1, "calling" is designated. As the event information for monitoring target software program 2, "writing data to an external storage" is designated. As the event information for monitoring target software program 3, "performing an electronic commerce transaction" is designated. As the event information for monitoring target software program 4, "opening or closing of a folding type cellular phone" is designated. As the event information for monitoring target software program 5, "pressing a specific key" is designated. As the event information for monitoring target software program 5, "suspending of an OS" is designated. The event-based monitoring controller unit determines that processes for only these pieces of the event information are performed.

Specifically, in a case where the event information that is designated when the event-based monitoring controller unit 45 is called by the event input unit 44 is event information other than these pieces of the event information, the event-based monitoring controller unit 45 does not perform the aforementioned monitoring.

The determination of the event information may be performed after the scheduling managements described with reference to FIGS. 12 to 14, or the scheduling managements described with reference to FIGS. 17 to 19 or before these scheduling managements.

In step S1206, the monitoring controller unit 43 waits for an input of an event in order to perform the monitoring by calling the monitoring unit 37 based on event information.

Figure 22:
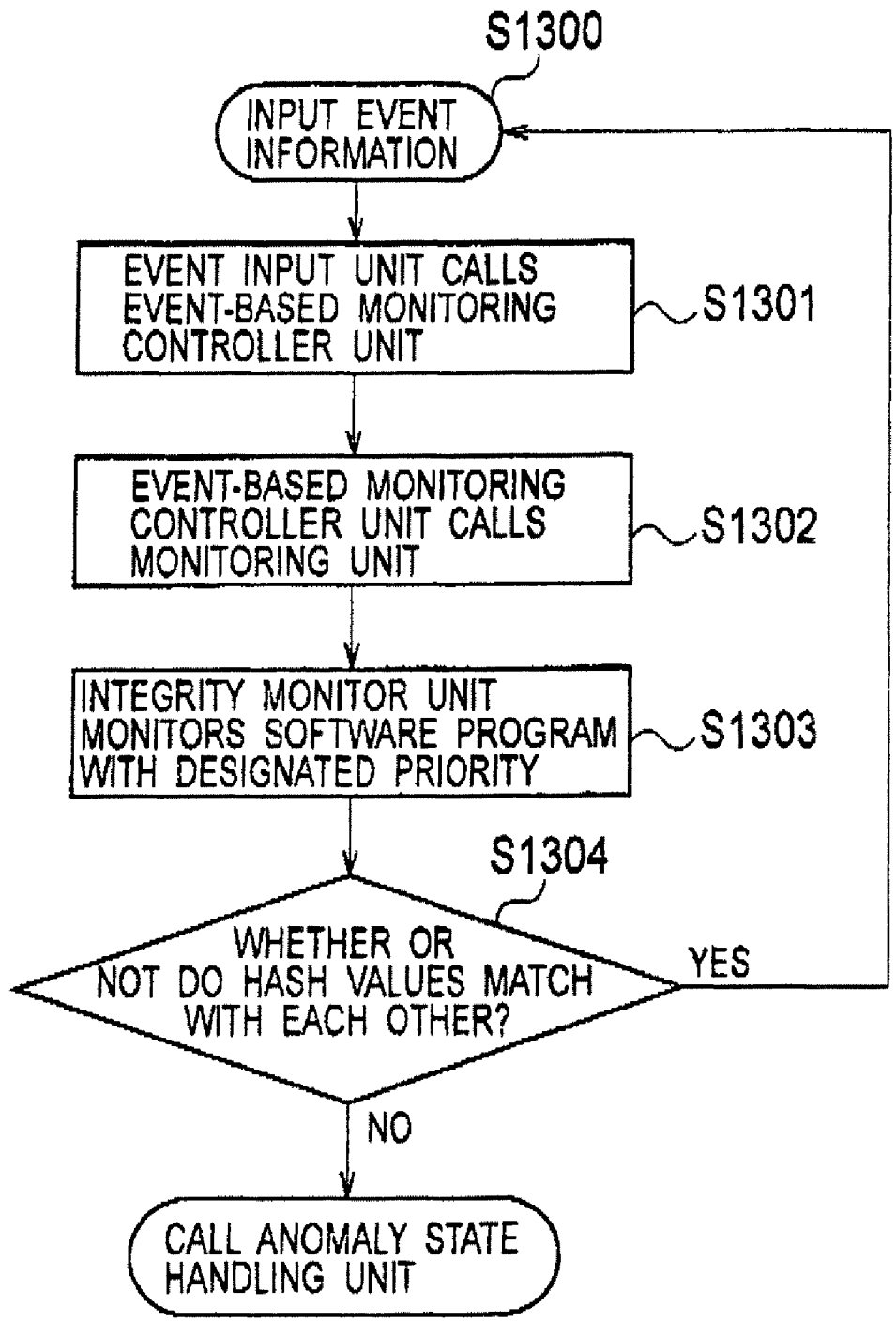
FIG. 22 is a flowchart showing procedures of monitoring integrity based on event information in the OS monitor apparatus according to the first embodiment of the present invention.

As shown in FIG. 22, upon receipt of event information from an outside such as the monitoring target OS or a peripheral device in step S1300, the event input unit 44 calls the event-based monitoring controller unit 45 in step S1301.

In step S1302, the event-based monitoring controller unit 45 extracts a software program having event information that is designated in the monitoring scheduling information and that matches with the inputted event information and calls the integrity monitoring unit 42.

In step S1303, the integrity monitoring unit 42 calculates the hash value of the monitoring target software program in accordance with the designation of the address in which the monitoring target software program having a priority equal to or greater than the designated priority and of the size of the monitoring target software program (memory or size), and compares the calculated hash value with the original hash value included in the monitoring setting information.

In step S1304, the integrity monitoring unit 42 determines that an anomaly exists in a case where the values do not matched with each other, and then calls the anomaly state handling unit 38.

On the other hand, in step S1304, the integrity monitoring unit 42 waits for an input of the next event information in a case where the both values match with each other.

It should be noted that although it is described in this embodiment that the event input unit 44 waits for an input of event information from an OS or a peripheral device, the event input unit 44 may autonomously detect event information by overseeing the state of an OS or a peripheral device.

One possible way is that the event input unit 44 may obtain event information by always sending a query to find a change in the opening or closing state of a folding type phone, for example.

Moreover, although, in the example of FIGS. 20 to 22, the operation of the integrity monitoring unit 42 is described, the parameter monitoring unit 41 may perform the same scheduling as that of the integrity monitoring unit 42.

Ninthly, referring to FIG. 23, a description will be given of an operation in which the OS monitor apparatus 30 sets a monitoring flag. In this embodiment, an assumption is made that a remotely located device management server issues a monitoring flag setting request via a radio network.

Figure 23:
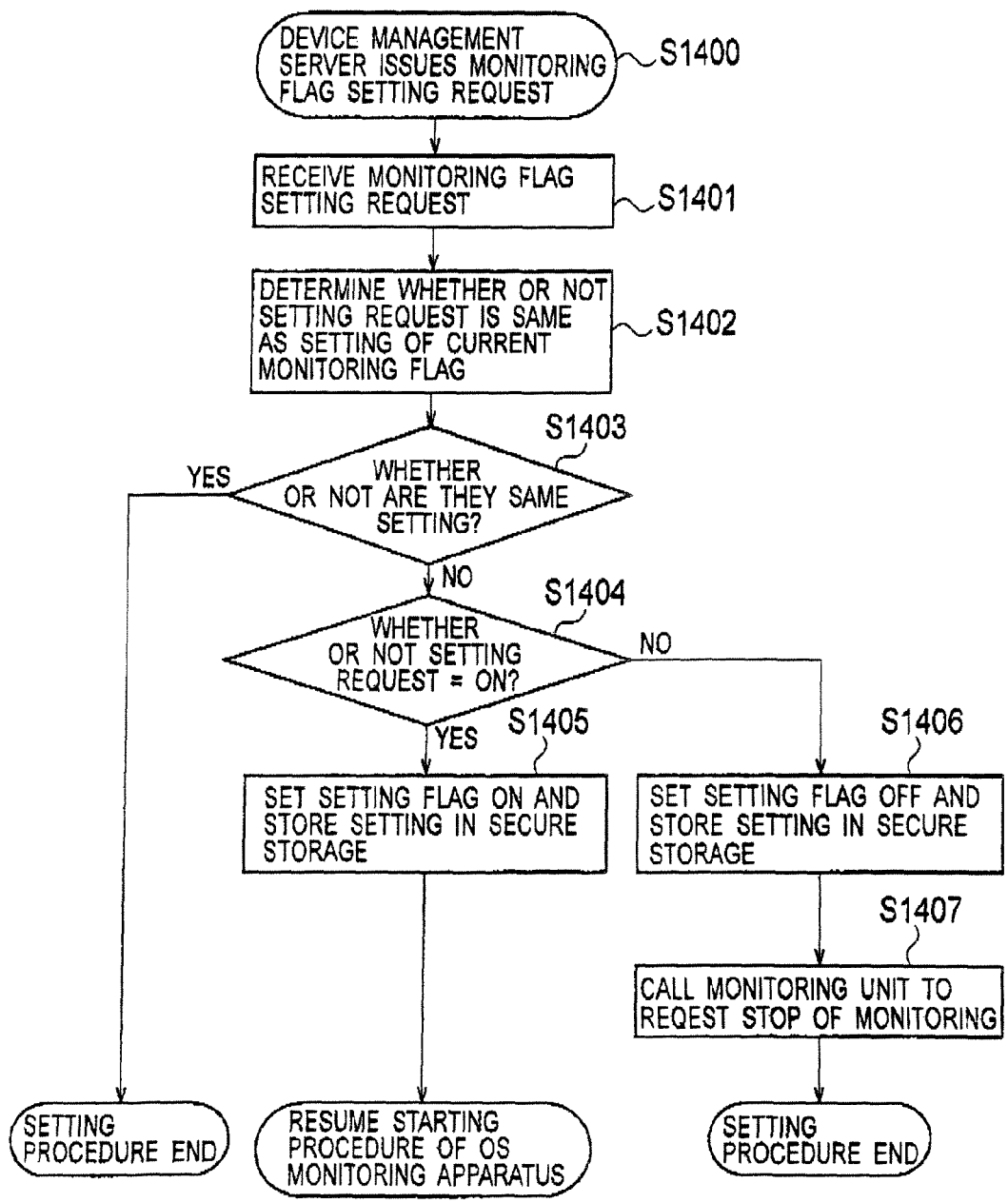
FIG. 23 is a flowchart showing procedures of setting a monitoring flag in the OS monitor apparatus according to the first embodiment of the present invention.

As shown in FIG. 23, in step S1401, the monitoring flag management unit 40 receives a monitoring flag setting request issued by the device management server.

In step S1402, the monitoring flag management unit 40 checks whether or not the received monitoring flag setting request indicates the same content as that of the current setting of the monitoring flag.

In step S1403, in a case where the request indicates the same content, since there is no need for a particular handling, the operation ends.

On the other hand, in a case where the request does not indicate the same content in step S1403, one of the following two processes is performed depending on whether the setting request indicates "ON" or "OFF."

In step S1404, in a case where the current setting of the monitoring flag is "OFF," and where the received setting request indicates "ON" in step S1405, the monitoring flag management unit 40 sets "ON" to the monitoring flag and then after saving the request in a secure storage, continues the operation from the process of step S305 shown in FIG. 9, and starts the OS monitor apparatus 30.

On the other hand, in a case where the current setting of the monitoring flag is "ON," and where the received setting request indicates "OFF" in step S1406, the monitoring flag management unit 40 sets "OFF" to the monitoring flag and then after saving the request in a secure storage, in step S1407, calls the monitoring unit 37 and issues a request for the cancellation of the monitoring.

It should be noted that although the description is given with the example in which the monitoring flag management unit 40 directly receives a setting request, here, it is also possible to employ a configuration in which another module of the device receives a setting request from a remotely located device management server once, then, calls the monitoring flag management unit 40, and passes the setting request to the monitoring flag management device 40.

Moreover, the monitoring flag management unit 40 may be configured to receive only a notification indicating that there is a monitoring flag setting request and then to receive the monitoring flag setting request by accessing the device management server upon receipt of the notification as a trigger.

Effects and Advantages of OS Monitoring Setting
Information Generator Apparatus and OS Monitor
Apparatus According to First Embodiment According to the OS monitoring setting information generator apparatus 10 and the OS monitor apparatus 30 in the case of the first embodiment, inconsistency occurring between a software update package or a monitoring target software program and monitoring setting information can be prevented by adding binding information indicating a correspondence relationship of the monitoring setting information and the monitoring target software program with respect to the monitoring setting information file.

In addition, according to the OS monitoring setting information generator apparatus 10 and the OS monitor apparatus 30 in the case of the first embodiment, by adding version information of the monitoring setting information file to the monitoring setting information file, the monitoring setting information file can be prevented from being replaced with the old monitoring setting information file.

Furthermore, according to the OS monitoring setting information generator apparatus 10 and the OS monitor apparatus 30 in the case of the first embodiment, by providing a digital signature of the monitoring setting information file to the monitoring setting information file, the monitoring setting information can be prevented from being modified, and the OS monitor apparatus can perform a secure monitoring.

Moreover, according to the OS monitoring setting information generator apparatus 10 and the OS monitor apparatus 30 in the case of the first embodiment, by checking the version of the latest monitoring setting information, the monitoring setting information file can be prevented from an attack that attempts to replace the monitoring setting information file with the old monitoring setting information file.

According to the OS monitoring setting information generator apparatus 10 and the OS monitor apparatus 30 in the case of the first embodiment, since the aforementioned monitoring setting information is provided by the OS monitoring setting information generator apparatus 10 to the OS monitor apparatus 30, the OS monitor apparatus 30 can check the integrity of the monitoring target software program by use of the monitoring setting information and perform an anomaly state handling process at the time of an existence of anomaly. Thus, the OS monitor apparatus 30 can maintain a normal operation of the device.

According to the OS monitoring setting information generator apparatus 10 and the OS monitor apparatus 30 in the case of the first embodiment, since the aforementioned monitoring setting information is provided by the OS monitoring setting information generator apparatus 10 to the OS monitor apparatus 30, the OS monitor apparatus 30 can maintain a normal operation of the device by examining, by use of the monitoring setting information, whether the value of a monitoring target parameter is a normal value or is modified.

According to the OS monitoring setting information generator apparatus 10 and the OS monitor apparatus 30 in the case of the first embodiment, the OS monitor apparatus 30 can perform a secure monitoring efficiently and sufficiently by appropriately scheduling the aforementioned monitoring by use of the aforementioned monitoring scheduling information.

According to the OS monitoring setting information generator apparatus 10 and the OS monitor apparatus 30 in the case of the first embodiment, by use of the aforementioned monitoring information, the OS monitor apparatus 30 monitors the monitoring target software program only when a specific event occurs or the OS monitor apparatus 30 is started. Thereby, the overhead for the aforementioned monitoring is reduced and an efficient monitoring can be performed.

According to the OS monitoring setting information generator apparatus 10 and the OS monitor apparatus 30 in the case of the first embodiment, the OS monitor apparatus 30 provides a high priority to a monitoring target software program that is an important software program or that is susceptible to an attack. In this manner, the OS monitor apparatus 30 monitors such software program with a high frequency while assuring security of the software program and reducing the monitoring frequency of a software program having a lower priority. Thereby, the OS monitor apparatus 30 can efficiently monitor the monitoring target software program.

According to the OS monitoring setting information generator apparatus 10 and the OS monitor apparatus 30 in the case of the first embodiment, the OS monitor apparatus 30 updates the monitoring target software program and the monitoring setting information file after performing a preliminary test (update test) to determine whether or not the monitoring setting information can be updated. Thus, the OS monitor apparatus 30 can handle the prevention of inconsistency caused by a trouble at the time of updating the monitoring target software program and the monitoring setting information.

According to the OS monitoring setting information generator apparatus 10 and the OS monitor apparatus 30 in the case of the first embodiment, inconsistency between the monitoring setting information and the software program can be prevented from occurring by checking the binding information of the software update package program and the monitoring target software program at the time of performing the preliminary test (update test) to determine whether or not the monitoring setting information can be updated.

Furthermore, according to the OS monitoring setting information generator apparatus 10 and the OS monitor apparatus 30 in the case of the first embodiment, inconsistency between the monitoring setting information and the software program can be prevented from occurring by examining consistency between the software update package saved on the device side and the monitoring setting information at the time of updating only the monitoring setting information.

According to the OS monitoring setting information generator apparatus 10 and the OS monitor apparatus 30 in the case of the first embodiment, a normal operation can be maintained by detecting a falsification or deletion of the monitoring target software program, made by a malicious software program.

According to the OS monitoring setting information generator apparatus 10 and the OS monitor apparatus 30 in the case of the first embodiment, even in a case where there is a trouble in a monitoring function of the monitoring unit 37, the monitoring function can be turned off from a remote location and respond to the trouble in a manner to turn on the monitoring function or the like after fixing the monitoring function.

According to the OS monitoring setting information generator apparatus 10 and the OS monitor apparatus 30 in the case of the first embodiment, even in a case where the updating of the monitoring setting information fails, the possibility of use of the device can be secured by starting the device by turning off the monitoring function.

Moreover, according to the OS monitoring setting information generator apparatus 10 and the OS monitor apparatus 30 in the case of the first embodiment, the OS monitor apparatus 30 itself can be prevented from being attacked, and the secure monitoring can be performed.

Furthermore, according to the present embodiment, a normal operation can be maintained by securely monitoring an OS or a software program (including a middle ware, application or driver) for the OS by not only preventing an update by an unauthorized monitoring setting information, but also preventing a trouble at the time of updating the monitoring setting information, a replacement of the monitoring setting information with the old setting information or the updating of the monitoring setting information inconsistent with a software package after updating the software program.

Moreover, according to the present embodiment, a software program whose arrangement address is determined at the time of an operation can be monitored by securely communicating with the OS.

Moreover, according to the present embodiment, the overhead of the monitoring process can be reduced by efficiently breaking down the monitoring process into pieces in consideration of a monitoring priority or an event type, and by reducing the monitoring process in consideration of a sleep state of the device.

Second Embodiment of the Invention

In a second embodiment of the present invention, the configuration and operation of the OS monitoring setting information generator apparatus 10 are the same as those in the case of the first embodiment. Moreover, the configuration of the OS monitor apparatus 30 is also the same as that in the case of the first embodiment. However, in the second embodiment, the arrangement of the OS monitor apparatus 30 in a device is different from that in the case of the first embodiment. In addition, in the second embodiment, a part of the operation of the OS monitor apparatus 30 is different from that in the case of the first embodiment.

Hereinafter, a description will be given while focusing on the differences in the arrangement and operation of the OS monitor apparatus 30 in the device.

Figure 24:
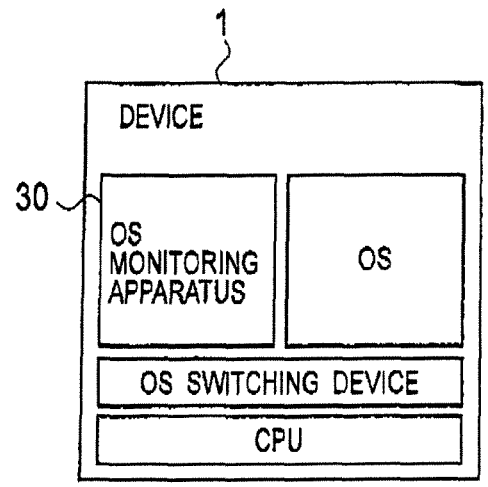
FIG. 24 is a configuration diagram of a device including an OS monitor apparatus according to a second embodiment of the present invention.

FIG. 24 shows a configuration of a device 1 including the OS monitor apparatus 30 according to the second embodiment of the invention.

In the second embodiment, the OS monitor apparatus 30 is a software program performed in an area isolated from the monitoring target OS. The OS monitor apparatus 30 is also configured to operate exclusively from the monitoring target OS by use of "OS Switching Device Including OS Switching Technique Based on Suspend and Resume, disclosed in the US Patent Application 20010018717A1.

In the first embodiment, an assumption is made that the OS monitor apparatus 30 operates in parallel with the OS and performs the aforementioned monitoring. In contrast to this, in the second embodiment, an assumption is made that the OS monitor apparatus 30 is configured to operate and to perform the aforementioned monitoring when the OS is in suspend mode or sleep mode.

Moreover, an assumption is made that the OS monitor apparatus 30 according to the present embodiment is started at the timing of starting the device or before the timing of starting the OS or after the timing of starting the OS.

Hereinafter, among the operations of the OS monitor apparatus 30 according to the present embodiment, operations that are different from those in the case of the first embodiment will be described.

Firstly, referring to FIGS. 25 and 26, a description will be given of an operation in which the OS monitor apparatus 30 according to the present embodiment cyclically monitors the integrity of a monitoring target software program.

Figure 25:
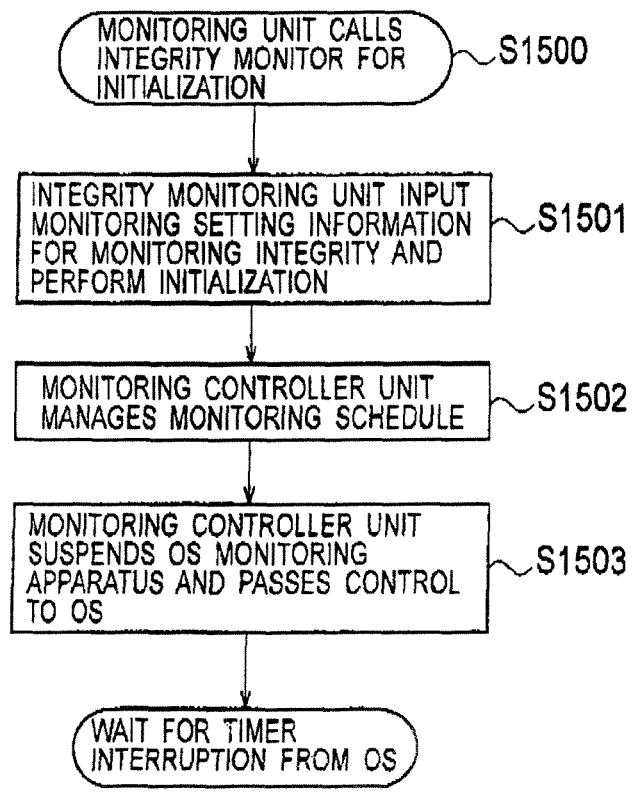
FIG. 25 is a flowchart showing procedures of monitoring integrity in the OS monitor apparatus according to the second embodiment of the present invention.

As shown in FIG. 25, operations from steps S1500 to S1502 are the same as those of the aforementioned step S600 to S602.

In step S1503, the monitoring controller 43 ends the process of starting the OS monitor apparatus 30, suspends the OS monitor apparatus 30 and returns the control to the OS.

In order to call the monitoring unit 37 at an appropriate timing, the monitoring controller unit 43 needs to be interrupted by the timer interruption at intervals not greater than the monitoring cycle designated by the monitoring scheduling information. In this embodiment, however, since the environment in which the OS and the OS monitor apparatus 30 operate exclusively is employed, the OS needs to voluntarily shift itself into a suspend mode and then passes the control to the OS monitor apparatus 30.

For this reason, an assumption is made that the OS is configured to shift itself into a suspend mode in a cycle of 30 seconds, for example, and then to pass the control to the OS monitor apparatus 30 in order that the monitoring controller unit 43 can be started.

It should be noted that the cycle in which the OS shifts itself into suspend mode can be designated by the monitoring controller unit 43 for the monitoring target OS.

The monitoring cycle designated in the monitoring scheduling information shown in FIG. 13, for example, is greater than 30 seconds. In this case, since one minute is sufficient for the cycle of suspending the OS, the monitoring controller unit 43 designates one minute for the cycle of suspending the OS with respect to the OS. Thereby, an improvement in response time due to reduction in a processing amount or reduction in power consumption can be achieved.

Figure 26:
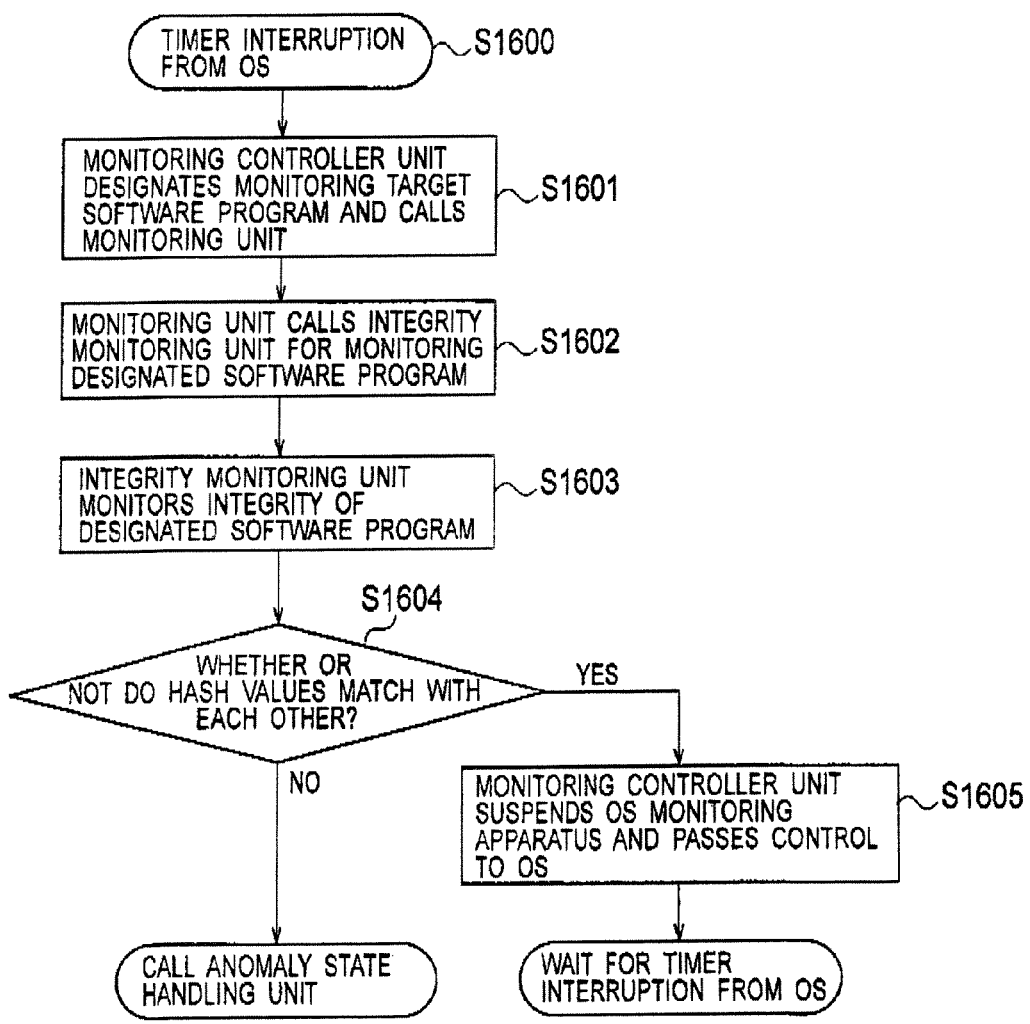
FIG. 26 is a flowchart showing procedures of monitoring integrity in the OS monitor apparatus according to the second embodiment of the present invention.

As shown in FIG. 26, operations from steps S1600 to S1604 are the same as the aforementioned operations from steps S700 to S704 of FIG. 14.

In step S1604, in a case where the two hash values match with each other, the monitoring controller unit 43 suspends the OS monitor apparatus 30, then passes the control to the OS and waits for a timer interruption from the next OS.

It should be noted that as to "the operation in which the OS monitor apparatus 30 monitors the integrity of a monitoring target software program based on the monitoring priority," the differences between the case of the first embodiment and the case of the aforementioned embodiment are the same as those in the case of "the operation in which the OS monitor apparatus 30 according to the present embodiment monitors the integrity of a monitoring target software program cyclically." Accordingly, the descriptions for those are omitted here.

Secondly, referring to FIGS. 27 and 28, a description will be given of an operation in which the OS monitor apparatus 30 monitors the integrity of a monitoring target software program based on event information. In this embodiment, as shown in FIG. 21, an assumption is made that an event type (event information) is designated as the monitoring scheduling information.

Figure 27:
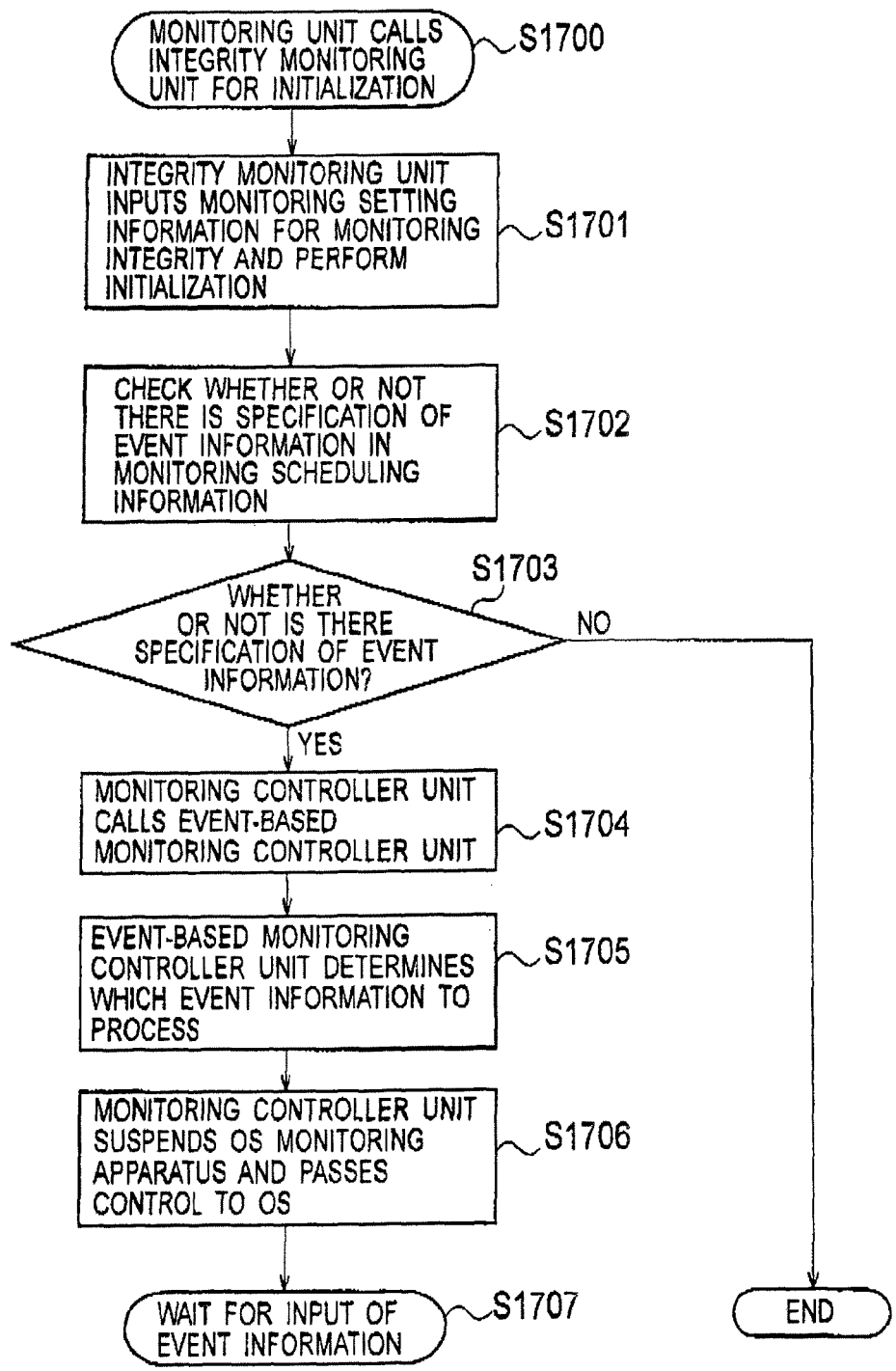
FIG. 27 is a flowchart showing procedures of monitoring integrity based on event information in the OS monitor apparatus according to the second embodiment of the present invention.

As shown in FIG. 27, operations from steps S1700 to S1705 are the same as those from steps S1200 to S1205 in FIG. 20.

In step S1706, the monitoring controller unit 43 ends the process of starting the OS monitor apparatus 30, suspends the OS monitor apparatus 30 and returns the control to the OS.

In step S1707, the monitoring controller unit 43 waits for an input of event information in order to perform monitoring by calling the monitoring unit 37 based on the event information.

Figure 28:
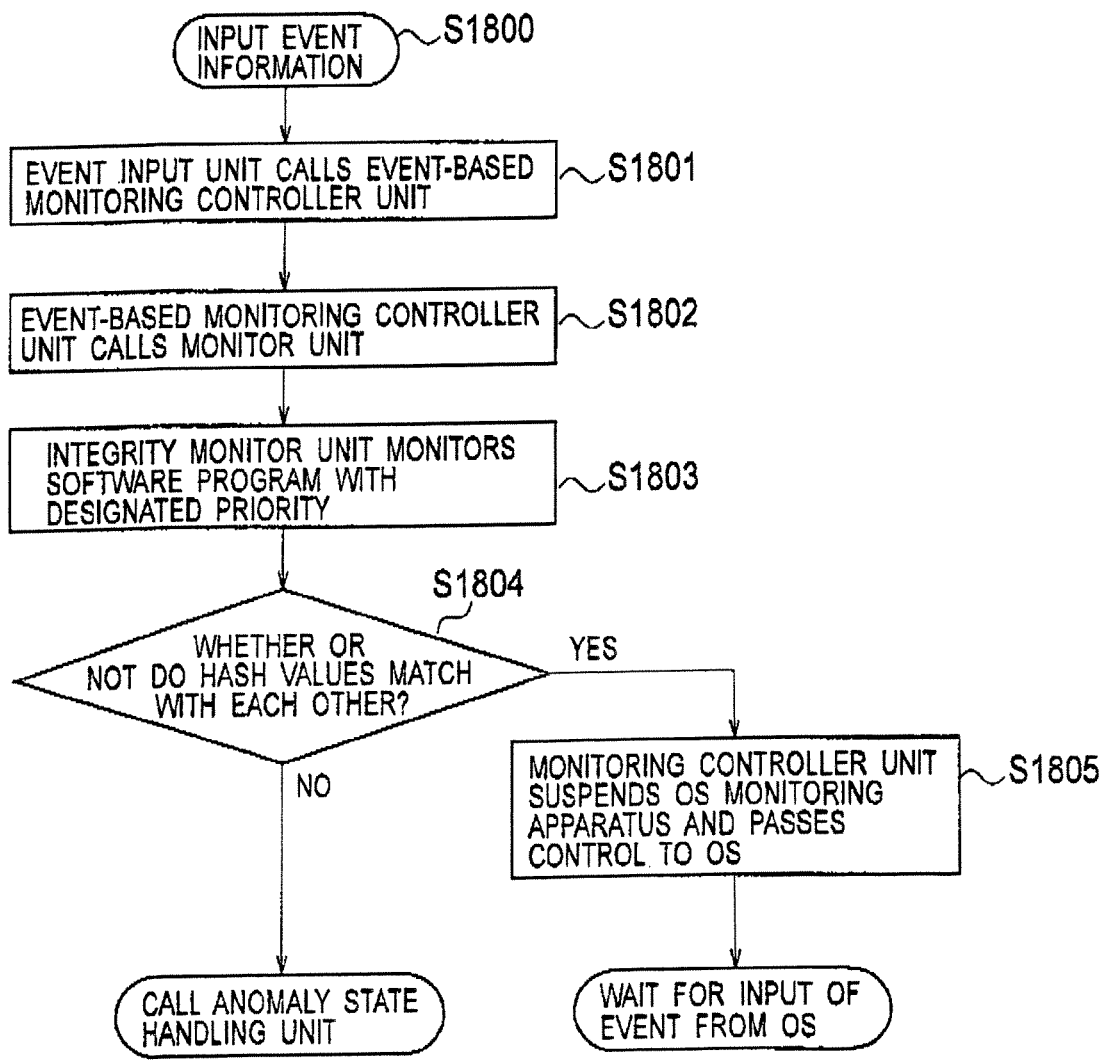
FIG. 28 is a flowchart showing procedures of monitoring integrity based on event information in the OS monitor apparatus according to the second embodiment of the present invention.

As shown in FIG. 28, operations from steps S1800 to S1804 are the same as those from steps S1300 to S1304 of FIG. 22.

In step S1804, in a case where the two hash values match with each other, the monitoring controller unit 43 suspends the OS monitor apparatus 30, then passes the control to the OS and waits for an input of event information from the next OS.

According to the present embodiment, since the OS and the OS monitor apparatus 30 do not operate in parallel with each other, the OS can operate without notifying the OS monitor apparatus 30 of the event information and without having an overhead other than the aforementioned switching instruction. Thus, an improvement in response time and reduction in power consumption can be achieved.

Third Embodiment of the Invention

In a third embodiment of the present invention, the configuration and operations of the OS monitoring setting information generator apparatus 10 are the same as those in the case of the first embodiment. Moreover, the configuration of the OS monitor apparatus 30 is also the same as that in the case of the first embodiment. The arrangement of the OS monitor apparatus 30 is, however, different and a part of the operation is also different.

Hereinafter, a description will be given while focusing on differences in the arrangement and operation of the OS monitor apparatus 30 in the device from those in the case of the first embodiment.

Figure 29:
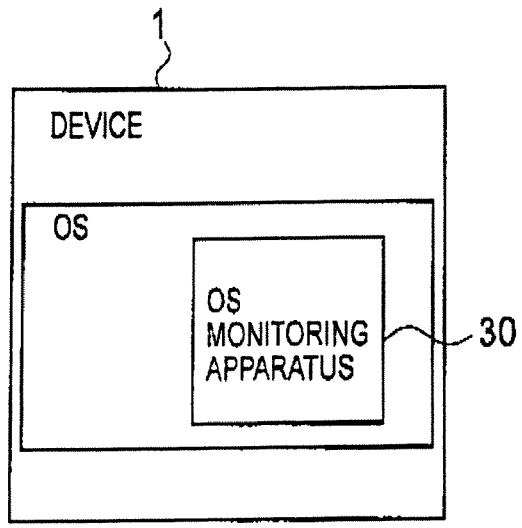
FIG. 29 is a configuration diagram of a device including an OS monitor apparatus according to a third embodiment of the present invention.

FIG. 29 shows a configuration of a device 1 including the OS monitor apparatus 30 according to the third embodiment of the invention.

In the third embodiment of the invention, the OS monitor apparatus 30 is implemented as a software program in the OS without being isolated from the monitoring target OS, and is configured to operate as a process or thread that is performed in parallel with the OS.

Hereinafter, a description will be given of, among the operations of the monitoring unit 30 according to the present embodiment, an operation that is different from that in the case of the first embodiment.

Specifically, referring to FIG. 30, a description will be given of an operation in which the OS monitor apparatus 30 according to the present embodiment is started.

Figure 30:
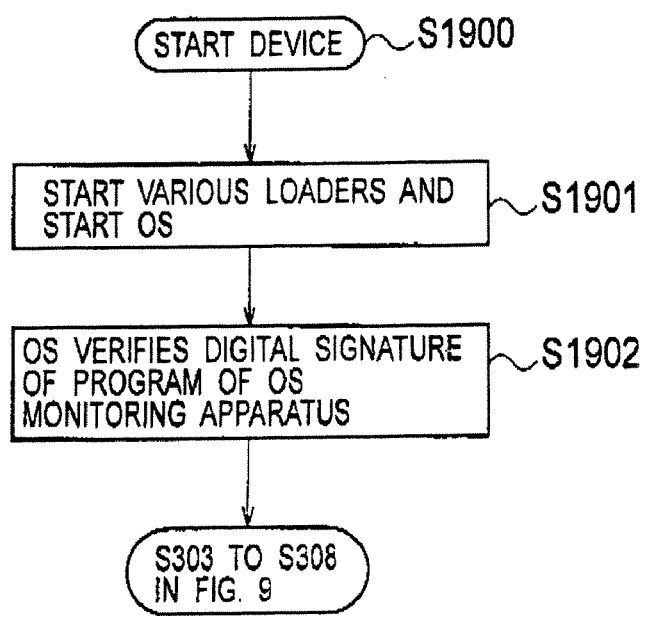
FIG. 30 is a flowchart showing starting procedures in the OS monitor apparatus according to the third embodiment of the present invention.

As shown in FIG. 30, when a device is started in step S1900, various loaders and the OS are started in step S1901. It should be noted that the OS starts the OS monitor apparatus 30.

In step S1902, the OS performs the verification of a digital signature provided to the program of the OS monitor apparatus before loading the program of the OS monitor apparatus 30.

Failure of the verification of the digital signature means that the program of the OS monitor apparatus 30 is damaged. Accordingly, the recovery process is performed.

Although the OS calls and causes the recovery unit 35 to perform the recovery process in this embodiment, another recovery process may be performed.

In addition, although the OS performs the verification of the digital signature in this embodiment, the validity of the program of the OS monitor apparatus 30 may be checked by calculating a hash value of the program and then checking whether or not the calculated hash value matches with the valid hash value of the OS monitor apparatus, saved in the OS.

The operations after this operation are the same as those in steps S303 to S308 of FIG. 9. Accordingly the descriptions of these operations are omitted here.

What is claimed is:

1. An operating system monitoring setting information generator apparatus comprising:
   a processor;
   a monitoring setting information management unit configured to store monitoring setting information used for monitoring performed by an operating system monitoring apparatus;
   a monitoring setting information output unit, implemented by the processor, configured to generate a monitoring setting information file including the monitoring setting information stored by the monitoring setting information management unit, version information and binding information indicating a correspondence with a monitoring target software program, and to output the generated monitoring setting information file, wherein the version information is information indicating a version of the monitoring setting information file, and the binding information is information indicating a correlation of the monitoring setting information file and the monitoring target software program; and
   a digital signature unit configured to generate a digital signature of the monitoring setting information file, and to add the generated digital signature to the monitoring setting information file,
   wherein the monitoring setting information includes a hash value of the monitoring target software program, an address at which the monitoring target software program is stored and a size of the monitoring target software program.

2. The operating system monitoring setting information generator apparatus according to claim 1, wherein the monitoring setting information includes a size of the monitoring target storage area and a possible range of a value stored in the monitoring target storage area.

3. The operating system monitoring setting information generator apparatus according to claim 1, wherein the monitoring setting information further includes monitoring scheduling information in which at least one of a timing of the monitoring, a frequency of the monitoring and a cycle of the monitoring are designated.

4. The operating system monitoring setting information generator apparatus according to claim 3, wherein the monitoring scheduling information designates, as the timing of the starting of the monitoring, at least one of the timing of starting the operating system monitoring apparatus, and a type of an event which triggers to perform the monitoring of the monitoring target software program.

5. The operating system monitoring setting information generator apparatus according to claim 3, wherein the monitoring scheduling information designates, as the frequency of the monitoring, a priority for the monitoring of the monitoring target software program.

6. An operating system monitoring apparatus which performs monitoring of a monitoring target software program on an operating system, comprising:
   a processor;
   a monitoring unit, implemented by the processor, configured to perform the monitoring by use of monitoring setting information included in a monitoring setting information file generated by an operating system monitoring setting information generator apparatus, the monitoring setting information file including version information and binding information indicating a correspondence with the monitoring target software program, wherein the version information is information indicating a version of the monitoring setting information file, and the binding information is information indicating a correlation of the monitoring setting information file and the monitoring target software program;
   an update testing unit configured to determine, before the monitoring target software program is updated, whether or not the monitoring setting information file can be updated;
   a monitoring setting information update unit configured to update the monitoring setting information file when it is determined that the monitoring setting information file can be updated, and a recovery unit configured to perform a recovery process for the monitoring setting information file when the updating of the monitoring setting information file has failed a predetermined number of times or more, wherein the monitoring setting information includes a hash value of the monitoring target software program, an address at which the monitoring target software program is stored and a size of the monitoring target software program.

7. The operating system monitoring apparatus according to claim 6, wherein the update testing unit is configured to check the binding information indicating a correspondence between the monitoring setting information file and the monitoring target software program.

8. The operating system monitoring apparatus according to claim 6, further comprising:

an integrity monitoring unit configured to calculate a hash value of the monitoring target software program based on the monitoring setting information, to compare the calculated hash value of the monitoring target software with the hash value of the monitoring target software program included in the monitoring setting information, and to determine that anomaly has occurred in the monitoring target software program when the two hash values do not match with each other.

9. The operating system monitoring apparatus according to claim 6, further comprising:

a monitoring controller unit configured to control the monitoring in accordance with monitoring scheduling information included in the monitoring setting information.

10. The operating system monitoring apparatus according to claim 9, further comprising:

an event-based monitoring controller unit configured to control the monitoring to perform when inputted event information has matched with a type of an event designated as a timing of the monitoring in the monitoring scheduling information.

11. The operating system monitoring apparatus according to claim 9, further comprising:

a priority-based monitoring controller unit configured to adjust a sequence of the monitoring or a cycle of the monitoring in accordance with a priority which is designated in the monitoring scheduling information.

12. The operating system monitoring apparatus according to claim 6, wherein the monitoring unit is configured to determine whether or not to perform the monitoring in accordance with a monitoring flag indicating whether or not the monitoring is necessary.

13. The operating system monitoring apparatus according to claim 6, further comprising:

a self-monitoring unit configured to detect a falsification in a program of the operating system monitoring apparatus itself or a parameter of the operating system monitoring apparatus itself.

14. The operating system monitoring apparatus according to claim 6, further comprising:

a parameter monitoring unit configured to determine that normality of a parameter in a monitoring target storage area based on the monitoring setting information, and the monitoring setting information includes a size of the monitoring target storage area, and a possible range of a value which is stored in the monitoring target storage area.

\* \* \* \* \*